(12) United States Patent
Chen et al.

(10) Patent No.: US 10,025,073 B1
(45) Date of Patent: Jul. 17, 2018

(54) OPTICAL IMAGING LENS

(71) Applicant: GENIUS ELECTRONIC OPTICAL CO., LTD., Taichung (TW)

(72) Inventors: Feng Chen, Xiamen (CN); Baina Chen, Xiamen (CN); Feng Li, Xiamen (CN)

(73) Assignee: GENIUS ELECTRONIC OPTICAL (XIAMEN) CO., LTD., Xiamen (CN)

( * ) Notice: Subject to any disclaimer, the term of this patent is extended or adjusted under 35 U.S.C. 154(b) by 0 days.

(21) Appl. No.: 15/442,459

(22) Filed: Feb. 24, 2017

(30) Foreign Application Priority Data

Jan. 17, 2017   (CN) .......................... 2017 1 0035161

(51) Int. Cl.
*G02B 9/62* (2006.01)
*G02B 13/00* (2006.01)
*G02B 27/00* (2006.01)

(52) U.S. Cl.
CPC .......... *G02B 13/0045* (2013.01); *G02B 9/62* (2013.01); *G02B 27/0025* (2013.01)

(58) Field of Classification Search
CPC ...... G02B 13/0045; G02B 9/62; G02B 13/04; G02B 13/005
USPC ................................. 359/713, 752, 756, 761
See application file for complete search history.

(56) References Cited

U.S. PATENT DOCUMENTS 9,897,785 B2 * 2/2018 Lin .......................... G02B 9/62

* cited by examiner

*Primary Examiner* — William Choi
(74) *Attorney, Agent, or Firm* — Baker & McKenzie LLP

(57) ABSTRACT

Present embodiments provide for optical imaging lenses. An optical imaging lens may comprise six lens elements positioned sequentially from an object side to an image side. By controlling the convex or concave shape of the surfaces of the lens elements and designing parameters satisfying at least one inequality, the optical imaging lens may exhibit better optical characteristics and the total length of the optical imaging lens may be shortened.

16 Claims, 33 Drawing Sheets

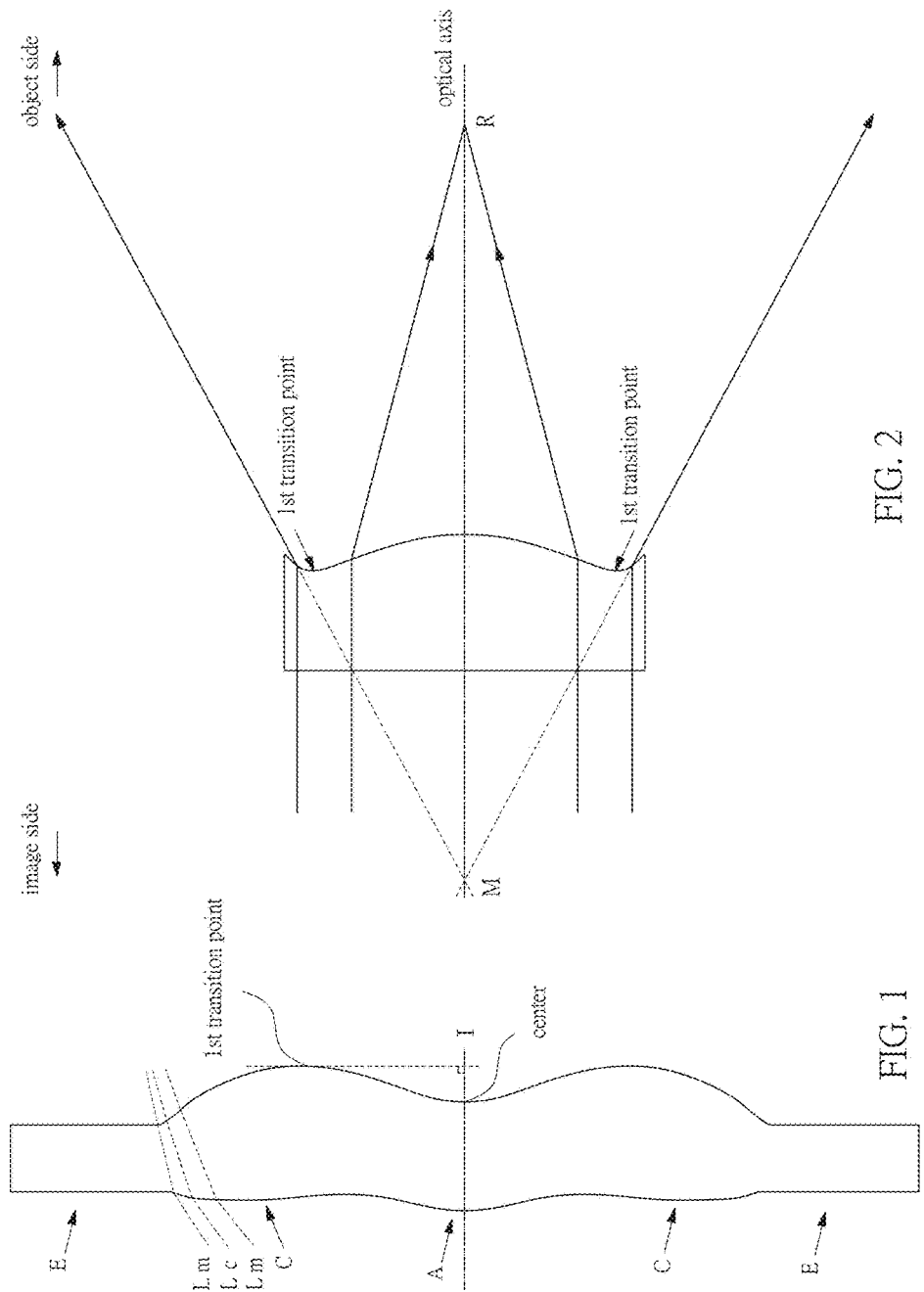

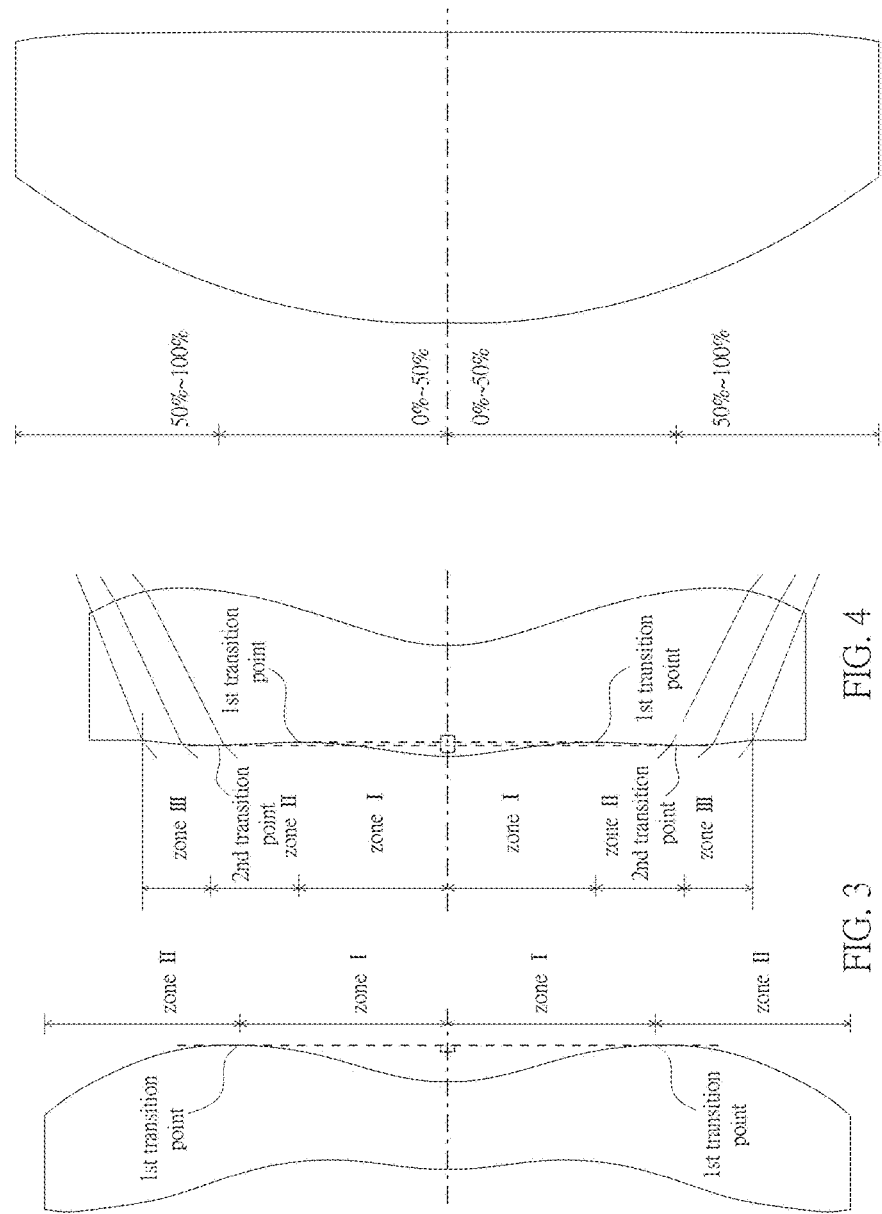

| Effective focal length (EFL) = 0.998 mm, (Half field of view) = 80.932deg., TTL (System length) = 7.929 mm, Fno = 2.17 ||||||||
|---|---|---|---|---|---|---|---|
| Surface # | | Radius (mm) | Thickness (mm) | Refractive index | Abbe number | Focus (mm) | Material |
| - | Object | ∞ | ∞ | | | | |
| 111 | 1st lens element | 174.4498 | 0.3992(T1) | 1.773(n1) | 49.613(v1) | -4.155(f1) | glass |
| 112 | | 3.1601 | 1.1715(G12) | | | | |
| 121 | 2nd lens element | -4.8509 | 1.6709(T2) | 1.642(n2) | 22.409(v2) | 4.889(f2) | plastic |
| 122 | | -2.1744 | 0.0962(G23) | | | | |
| 131 | 3rd lens element | -2.5858 | 0.9866(T3) | 1.535(n3) | 55.635(v3) | 11.822(f3) | plastic |
| 132 | | -2.0813 | 0.2932(G34-TA) | | | | |
| 100 | Aperture stop | ∞ | 0.1040(TA) | | | | |
| 141 | 4th lens element | 4.2713 | 0.9754(T4) | 1.535(n4) | 55.635(v4) | 1.434(f4) | plastic |
| 142 | | -0.8631 | 0.1200(G45) | | | | |
| 151 | 5th lens element | -0.3786 | 0.3513(T5) | 1.642(n5) | 22.409(v5) | -1.238(f5) | plastic |
| 152 | | -0.9796 | 0.0400(G56) | | | | |
| 161 | 6th lens element | 0.7575 | 0.6306(T6) | 1.535(n6) | 55.635(v6) | 1.695(f6) | plastic |
| 162 | | 3.2249 | 0.5000(G6F) | | | | |
| 171 | IR cut filter | ∞ | 0.2100(TF) | 1.517(nf) | 64.167(vf) | | |
| 172 | | ∞ | 0.3802(GFP) | | | | |
| 180 | Image plane | ∞ | | | | | |

FIG. 8

| Aspherical parameters | | | | | |
|---|---|---|---|---|---|
| Surface# | 121 | 122 | 131 | 132 | 141 |
| K | 0.000000E+00 | 0.000000E+00 | 0.000000E+00 | 0.000000E+00 | 0.000000E+00 |
| $a_4$ | 3.237294E-02 | 8.232616E-02 | 5.375729E-02 | 9.021072E-02 | 1.150821E-01 |
| $a_6$ | -7.867791E-03 | -1.784991E-02 | -3.739788E-03 | -7.122780E-02 | -1.363577E+00 |
| $a_8$ | 9.394980E-04 | 3.541408E-03 | -1.018280E-04 | 3.721536E-02 | 9.556298E+00 |
| $a_{10}$ | -5.626100E-05 | 6.150000E-05 | -4.361900E-04 | -1.149474E-02 | -4.109993E+01 |
| $a_{12}$ | 3.390000E-07 | -5.156500E-05 | -2.133210E-04 | 4.343777E-03 | 7.968028E+01 |
| $a_{14}$ | 2.088000E-06 | 4.052400E-05 | -1.981110E-04 | -4.462224E-03 | -4.609360E+01 |
| $a_{16}$ | 0.000000E+00 | 0.000000E+00 | 0.000000E+00 | 0.000000E+00 | 0.000000E+00 |
| Surface# | 142 | 151 | 152 | 161 | 162 |
| K | 0.000000E+00 | -3.178524E+00 | -1.283694E-02 | -9.205424E+00 | 0.000000E+00 |
| $a_4$ | 3.720473E-01 | -4.750494E-01 | 4.476413E-01 | -2.126216E-02 | -2.595528E-02 |
| $a_6$ | -1.451024E+00 | 1.053124E+00 | 3.093399E-01 | -3.598268E-02 | -9.151961E-02 |
| $a_8$ | 2.547934E+00 | 8.919038E-01 | 2.052281E-01 | 1.767745E-02 | 9.858808E-02 |
| $a_{10}$ | 4.468128E-01 | -5.803261E+00 | 1.008547E-01 | 1.024042E-02 | -8.913104E-02 |
| $a_{12}$ | -7.645293E+00 | 3.923310E+00 | -1.196167E+00 | 8.404153E-03 | 5.948051E-02 |
| $a_{14}$ | 8.005773E+00 | 1.054131E+00 | 9.753462E-01 | -1.585762E-02 | -2.223704E-02 |
| $a_{16}$ | 0.000000E+00 | 0.000000E+00 | 0.000000E+00 | 4.642989E-03 | 3.225871E-03 |

FIG. 9

| Effective focal length (EFL) = 1.006 mm, (Half field of view) = 80.932deg., TTL (System length) = 9.581 mm, Fno = 2.19 |||||||
|---|---|---|---|---|---|---|---|
| Surface # | | Radius (mm) | Thickness (mm) | Refractive index | Abbe number | Focus (mm) | Material |
| - | Object | ∞ | ∞ | | | | |
| 211 | 1st lens element | -153.4753 | 0.4024(T1) | 1.773(n1) | 49.613(v1) | -6.603(f1) | glass |
| 212 | | 5.3026 | 1.0718(G12) | | | | |
| 221 | 2nd lens element | -3.9369 | 2.0508(T2) | 1.642(n2) | 22.409(v2) | 5.424(f2) | plastic |
| 222 | | -2.2359 | 0.0552(G23) | | | | |
| 231 | 3rd lens element | -2.3988 | 2.3912(T3) | 1.535(n3) | 55.635(v3) | 7.989(f3) | plastic |
| 232 | | -2.0729 | 0.2895(G34-TA) | | | | |
| 200 | Aperture stop | ∞ | 0.1176(TA) | | | | |
| 241 | 4th lens element | 4.4640 | 0.9762(T4) | 1.535(n4) | 55.635(v4) | 1.464(f4) | plastic |
| 242 | | -0.8796 | 0.2041(G45) | | | | |
| 251 | 5th lens element | -0.3702 | 0.3220(T5) | 1.642(n5) | 22.409(v5) | -1.138(f5) | plastic |
| 252 | | -0.9987 | 0.0400(G56) | | | | |
| 261 | 6th lens element | 0.7605 | 0.7498(T6) | 1.535(n6) | 55.635(v6) | 1.664(f6) | plastic |
| 262 | | 3.3752 | 0.5000(G6F) | | | | |
| 271 | IR cut filter | ∞ | 0.2100(TF) | 1.517(nf) | 64.167(vf) | | |
| 272 | | ∞ | 0.1996(GFP) | | | | |
| 280 | Image plane | ∞ | | | | | |

FIG. 12

| Aspherical parameters | | | | | |
|---|---|---|---|---|---|
| Surface# | 221 | 222 | 231 | 232 | 241 |
| K | 0.000000E+00 | 0.000000E+00 | 0.000000E+00 | 0.000000E+00 | 0.000000E+00 |
| $a_4$ | 3.323543E-02 | 7.891182E-02 | 5.517583E-02 | 9.998066E-02 | 5.308068E-02 |
| $a_6$ | -6.953688E-03 | -1.663007E-02 | -4.759451E-03 | -7.051369E-02 | -1.388468E+00 |
| $a_8$ | 1.016985E-03 | 3.827136E-03 | 3.017510E-04 | 4.138996E-02 | 9.479401E+00 |
| $a_{10}$ | -6.163400E-05 | 5.504000E-05 | 1.275080E-04 | 2.787490E-04 | -4.097150E+01 |
| $a_{12}$ | -4.325000E-06 | -8.180200E-05 | 1.650520E-04 | 2.506693E-03 | 8.018887E+01 |
| $a_{14}$ | 5.370000E-07 | 2.091000E-05 | -1.904500E-05 | -1.465563E-02 | -5.790407E+01 |
| $a_{16}$ | 0.000000E+00 | 0.000000E+00 | 0.000000E+00 | 0.000000E+00 | 0.000000E+00 |
| Surface# | 242 | 251 | 252 | 261 | 262 |
| K | 0.000000E+00 | -3.178524E+00 | -1.283694E-02 | -9.205424E+00 | 0.000000E+00 |
| $a_4$ | 4.157591E-01 | -4.501815E-01 | 4.185751E-01 | -8.282421E-02 | -2.510666E-02 |
| $a_6$ | -1.418354E+00 | 1.073533E+00 | 2.702024E-01 | -8.504645E-03 | -5.881792E-02 |
| $a_8$ | 2.613549E+00 | 9.265943E-01 | 1.889500E-01 | 2.928815E-02 | 9.195790E-02 |
| $a_{10}$ | 4.670762E-01 | -5.611362E+00 | 6.730318E-02 | 9.900516E-03 | -8.748430E-02 |
| $a_{12}$ | -7.803426E+00 | 4.269910E+00 | -1.217761E+00 | 2.283282E-03 | 6.013159E-02 |
| $a_{14}$ | 7.897073E+00 | 1.226235E+00 | 1.010559E+00 | -2.015021E-02 | -2.215267E-02 |
| $a_{16}$ | 0.000000E+00 | 0.000000E+00 | 0.000000E+00 | 3.058872E-03 | 3.012613E-03 |

FIG. 13

| Effective focal length (EFL) = 1.070 mm, (Half field of view) = 80.932deg., TTL (System length) = 10.543 mm, Fno = 2.33 ||||||||
|---|---|---|---|---|---|---|---|
| Surface # | | Radius (mm) | Thickness (mm) | Refractive index | Abbe number | Focus (mm) | Material |
| - | Object | ∞ | ∞ | | | | |
| 311 | 1st lens element | 136.6027 | 0.4665(T1) | 1.773(n1) | 49.601(v1) | -6.574(f1) | glass |
| 312 | | 4.9067 | 2.5818(G12) | | | | |
| 321 | 2nd lens element | -5.3012 | 1.3425(T2) | 1.642(n2) | 22.409(v2) | 5.894(f2) | plastic |
| 322 | | -2.4393 | 0.1565(G23) | | | | |
| 331 | 3rd lens element | -2.5710 | 2.2322(T3) | 1.535(n3) | 55.635(v3) | 6.655(f3) | plastic |
| 332 | | -1.9473 | 0.4305(G34-TA) | | | | |
| 300 | Aperture stop | ∞ | 0.0285(TA) | | | | |
| 341 | 4th lens element | 3.2971 | 1.3036(T4) | 1.535(n4) | 55.635(v4) | 1.524(f4) | plastic |
| 342 | | -0.9369 | 0.1189(G45) | | | | |
| 351 | 5th lens element | -0.3664 | 0.2623(T5) | 1.642(n5) | 22.409(v5) | -1.068(f5) | plastic |
| 352 | | -0.9985 | 0.0400(G56) | | | | |
| 361 | 6th lens element | 0.7064 | 0.7657(T6) | 1.535(n6) | 55.635(v6) | 1.608(f6) | plastic |
| 362 | | 2.4265 | 0.5000(G6F) | | | | |
| 371 | IR cut filter | ∞ | 0.2100(TF) | 1.517(nf) | 64.167(vf) | | |
| 372 | | ∞ | 0.1041(GFP) | | | | |
| 380 | Image plane | ∞ | | | | | |

FIG. 16

| Aspherical parameters | | | | | |
|---|---|---|---|---|---|
| Surface# | 321 | 322 | 331 | 332 | 341 |
| K | 0.000000E+00 | 0.000000E+00 | 0.000000E+00 | 0.000000E+00 | 0.000000E+00 |
| $a_4$ | 3.647924E-02 | 7.939181E-02 | 5.094606E-02 | 9.515349E-02 | 1.373009E-01 |
| $a_6$ | -6.941489E-03 | -1.527458E-02 | -6.453437E-03 | -6.644028E-02 | -1.158297E+00 |
| $a_8$ | 1.020787E-03 | 3.685996E-03 | 3.200990E-04 | 3.892061E-02 | 8.857094E+00 |
| $a_{10}$ | -6.346500E-05 | -8.911600E-05 | 1.327870E-04 | -1.024081E-02 | -4.091270E+01 |
| $a_{12}$ | -5.000000E-06 | -8.356800E-05 | 1.473510E-04 | -7.929040E-04 | 9.109438E+01 |
| $a_{14}$ | 6.740000E-07 | 4.260300E-05 | -3.920000E-05 | 6.019670E-04 | -7.248906E+01 |
| $a_{16}$ | 0.000000E+00 | 0.000000E+00 | 0.000000E+00 | 0.000000E+00 | 0.000000E+00 |
| Surface# | 342 | 351 | 352 | 361 | 362 |
| K | 0.000000E+00 | -3.178524E+00 | -1.283694E-02 | -9.205424E+00 | 0.000000E+00 |
| $a_4$ | 3.256513E-01 | -4.432091E-01 | 4.358643E-01 | -1.639672E-01 | -4.821351E-02 |
| $a_6$ | -1.339422E+00 | 1.029641E+00 | 2.734402E-01 | -1.338132E-02 | -6.670327E-02 |
| $a_8$ | 2.629466E+00 | 9.291515E-01 | 2.130764E-01 | 3.454842E-02 | 8.398279E-02 |
| $a_{10}$ | 4.762207E-01 | -5.598680E+00 | 8.564001E-02 | 2.540860E-02 | -8.975312E-02 |
| $a_{12}$ | -7.885483E+00 | 4.390297E+00 | -1.230010E+00 | 8.233079E-03 | 6.077631E-02 |
| $a_{14}$ | 8.166518E+00 | 1.098600E+00 | 9.852465E-01 | -2.308345E-02 | -2.160220E-02 |
| $a_{16}$ | 0.000000E+00 | 0.000000E+00 | 0.000000E+00 | -1.686196E-03 | 2.961887E-03 |

FIG. 17

| Effective focal length (EFL) = 1.016 mm, (Half field of view) = 80.932deg., TTL (System length) = 9.742 mm, Fno = 2.21 |||||||
| --- | --- | --- | --- | --- | --- | --- | --- |
| Surface # | | Radius (mm) | Thickness (mm) | Refractive index | Abbe number | Focus (mm) | Material |
| - | Object | ∞ | ∞ | | | | |
| 411 | 1st lens element | -269.9313 | 0.4065(T1) | 1.773(n1) | 49.613(v1) | -4.881(f1) | glass |
| 412 | | 3.8411 | 1.9537(G12) | | | | |
| 421 | 2nd lens element | -8.7862 | 1.2914(T2) | 1.642(n2) | 22.409(v2) | 7.030(f2) | plastic |
| 422 | | -3.1712 | 0.3967(G23) | | | | |
| 431 | 3rd lens element | -2.8068 | 1.7668(T3) | 1.535(n3) | 55.635(v3) | 6.644(f3) | plastic |
| 432 | | -1.9150 | 0.4880(G34-TA) | | | | |
| 400 | Aperture stop | ∞ | -0.0013(TA) | | | | |
| 441 | 4th lens element | 3.0122 | 1.3935(T4) | 1.535(n4) | 55.635(v4) | 1.531(f4) | plastic |
| 442 | | -0.9464 | 0.1214(G45) | | | | |
| 451 | 5th lens element | -0.3617 | 0.2514(T5) | 1.642(n5) | 22.409(v5) | -1.042(f5) | plastic |
| 452 | | -0.9925 | 0.0400(G56) | | | | |
| 461 | 6th lens element | 0.6919 | 1.0159(T6) | 1.535(n6) | 55.635(v6) | 1.423(f6) | plastic |
| 462 | | 3.6124 | 0.3000(G6F) | | | | |
| 471 | IR cut filter | ∞ | 0.2100(TF) | 1.517(nf) | 64.167(vf) | | |
| 472 | | ∞ | 0.1084(GFP) | | | | |
| 480 | Image plane | ∞ | | | | | |

FIG. 20

| Aspherical parameters | | | | | |
|---|---|---|---|---|---|
| Surface# | 421 | 422 | 431 | 432 | 441 |
| K | 0.000000E+00 | 0.000000E+00 | 0.000000E+00 | 0.000000E+00 | 0.000000E+00 |
| $a_4$ | 3.820430E-02 | 6.814184E-02 | 5.651337E-02 | 1.012186E-01 | 1.232011E-01 |
| $a_6$ | -7.182238E-03 | -1.342623E-02 | -7.640345E-03 | -6.728897E-02 | -9.605402E-01 |
| $a_8$ | 1.142365E-03 | 4.307181E-03 | 1.282426E-03 | 3.843033E-02 | 7.758700E+00 |
| $a_{10}$ | -6.167000E-05 | -2.535460E-04 | 3.120520E-04 | -9.455810E-03 | -4.165820E+01 |
| $a_{12}$ | -8.430000E-06 | -7.959100E-05 | 8.124600E-05 | -2.121594E-03 | 1.184004E+02 |
| $a_{14}$ | 3.700000E-07 | 7.001000E-05 | -4.874000E-05 | 1.329917E-03 | -1.385406E+02 |
| $a_{16}$ | 0.000000E+00 | 0.000000E+00 | 0.000000E+00 | 0.000000E+00 | 0.000000E+00 |
| Surface# | 442 | 451 | 452 | 461 | 462 |
| K | 0.000000E+00 | -3.178524E+00 | -1.283694E-02 | -9.205424E+00 | 0.000000E+00 |
| $a_4$ | 3.507316E-01 | -3.917261E-01 | 4.789155E-01 | -1.259890E-01 | 1.416648E-02 |
| $a_6$ | -1.274955E+00 | 1.039526E+00 | 2.356724E-01 | 3.197168E-02 | -4.241840E-02 |
| $a_8$ | 2.645925E+00 | 9.027640E-01 | 2.164967E-01 | 3.709332E-02 | 6.406911E-02 |
| $a_{10}$ | 4.274155E-01 | -5.478227E+00 | 1.112979E-01 | -2.191500E-05 | -8.963929E-02 |
| $a_{12}$ | -8.061886E+00 | 4.504160E+00 | -1.205677E+00 | 4.647980E-04 | 6.388862E-02 |
| $a_{14}$ | 8.141016E+00 | 6.203262E-01 | 9.897293E-01 | -1.627715E-02 | -2.157243E-02 |
| $a_{16}$ | 0.000000E+00 | 0.000000E+00 | 0.000000E+00 | 6.885299E-03 | 2.777993E-03 |

FIG. 21

| Effective focal length (EFL) = 1.121 mm, (Half field of view) = 80.932deg., TTL (System length) = 9.643 mm, Fno = 2.44 ||||||||
|---|---|---|---|---|---|---|---|
| Surface # | | Radius (mm) | Thickness (mm) | Refractive index | Abbe number | Focus (mm) | Material |
| - | Object | ∞ | ∞ | | | | |
| 511 | 1st lens element | 97.7720 | 0.7136(T1) | 1.773(n1) | 49.613(v1) | -5.078(f1) | glass |
| 512 | | 3.7730 | 1.4328(G12) | | | | |
| 521 | 2nd lens element | -4.6918 | 1.4275(T2) | 1.642(n2) | 22.409(v2) | 5.924(f2) | plastic |
| 522 | | -2.3624 | 0.1963(G23) | | | | |
| 531 | 3rd lens element | -2.4980 | 1.8662(T3) | 1.535(n3) | 55.635(v3) | 7.245(f3) | plastic |
| 532 | | -1.9170 | 0.4629(G34-TA) | | | | |
| 500 | Aperture stop | ∞ | 0.0570(TA) | | | | |
| 541 | 4th lens element | 3.6095 | 1.1893(T4) | 1.535(n4) | 55.635(v4) | 1.494(f4) | plastic |
| 542 | | -0.9115 | 0.1133(G45) | | | | |
| 551 | 5th lens element | -0.3704 | 0.2550(T5) | 1.642(n5) | 22.409(v5) | -1.087(f5) | plastic |
| 552 | | -0.9937 | 0.0400(G56) | | | | |
| 561 | 6th lens element | 0.7128 | 0.5967(T6) | 1.535(n6) | 55.635(v6) | 1.665(f6) | plastic |
| 562 | | 2.4999 | 0.5000(G6F) | | | | |
| 571 | IR cut filter | ∞ | 0.2100(TF) | 1.517(nf) | 64.167(vf) | | |
| 572 | | ∞ | 0.4018(GFP) | | | | |
| 580 | Image plane | ∞ | | | | | |

FIG. 24

| Aspherical parameters | | | | | |
|---|---|---|---|---|---|
| Surface# | 521 | 522 | 531 | 532 | 541 |
| K | 0.000000E+00 | 0.000000E+00 | 0.000000E+00 | 0.000000E+00 | 0.000000E+00 |
| $a_4$ | 3.956428E-02 | 8.211598E-02 | 5.545181E-02 | 9.939177E-02 | 1.366363E-01 |
| $a_6$ | -7.200415E-03 | -1.584422E-02 | -7.647233E-03 | -6.509409E-02 | -1.157750E+00 |
| $a_8$ | 1.051178E-03 | 3.689401E-03 | 4.306200E-05 | 3.919784E-02 | 8.816444E+00 |
| $a_{10}$ | -5.778400E-05 | -6.490900E-05 | 2.157140E-04 | -1.044369E-02 | -4.105115E+01 |
| $a_{12}$ | -5.903000E-06 | -8.601900E-05 | 1.488260E-04 | -1.227460E-03 | 9.403750E+01 |
| $a_{14}$ | 5.550000E-07 | 2.858900E-05 | -4.011900E-05 | 9.547580E-04 | -8.459123E+01 |
| $a_{16}$ | 0.000000E+00 | 0.000000E+00 | 0.000000E+00 | 0.000000E+00 | 0.000000E+00 |
| Surface# | 542 | 551 | 552 | 561 | 562 |
| K | 0.000000E+00 | -3.178524E+00 | -1.283694E-02 | -9.205424E+00 | 0.000000E+00 |
| $a_4$ | 3.701918E-01 | -4.235086E-01 | 4.716310E-01 | -8.993001E-02 | -4.512453E-02 |
| $a_6$ | -1.310398E+00 | 1.053080E+00 | 2.641389E-01 | -3.663596E-03 | -8.141380E-02 |
| $a_8$ | 2.605932E+00 | 1.027556E+00 | 2.285442E-01 | 1.881847E-02 | 9.136099E-02 |
| $a_{10}$ | 5.245671E-01 | -5.633047E+00 | 1.050717E-01 | 1.576724E-02 | -8.969204E-02 |
| $a_{12}$ | -7.846178E+00 | 4.211720E+00 | -1.227437E+00 | 3.103254E-03 | 6.008889E-02 |
| $a_{14}$ | 7.754342E+00 | 8.772322E-01 | 9.759130E-01 | -1.869615E-02 | -2.174077E-02 |
| $a_{16}$ | 0.000000E+00 | 0.000000E+00 | 0.000000E+00 | 6.496931E-03 | 3.078773E-03 |

FIG. 25

| Effective focal length (EFL) = 1.128 mm, (Half field of view) = 80.932deg., TTL (System length) = 9.464 mm, Fno = 2.46 | | | | | | | |
|---|---|---|---|---|---|---|---|
| Surface # | | Radius (mm) | Thickness (mm) | Refractive index | Abbe number | Focus (mm) | Material |
| - | Object | ∞ | ∞ | | | | |
| 611 | 1st lens element | 110.2725 | 0.7181(T1) | 1.773(n1) | 49.613(v1) | -5.061(f1) | glass |
| 612 | | 3.7780 | 1.4926(G12) | | | | |
| 621 | 2nd lens element | -4.8329 | 1.4362(T2) | 1.642(n2) | 22.409(v2) | 6.546(f2) | plastic |
| 622 | | -2.5215 | 0.2939(G23) | | | | |
| 631 | 3rd lens element | -2.4667 | 1.6785(T3) | 1.535(n3) | 55.635(v3) | 6.700(f3) | plastic |
| 632 | | -1.8100 | 0.4938(G34-TA) | | | | |
| 600 | Aperture stop | ∞ | 0.0516(TA) | | | | |
| 641 | 4th lens element | 3.2917 | 1.2395(T4) | 1.535(n4) | 55.635(v4) | 1.510(f4) | plastic |
| 642 | | -0.9332 | 0.1187(G45) | | | | |
| 651 | 5th lens element | -0.3702 | 0.2562(T5) | 1.642(n5) | 22.409(v5) | -1.083(f5) | plastic |
| 652 | | -0.9980 | 0.0400(G56) | | | | |
| 661 | 6th lens element | 0.7132 | 0.5569(T6) | 1.535(n6) | 55.635(v6) | 1.667(f6) | plastic |
| 662 | | 2.5642 | 0.5000(G6F) | | | | |
| 671 | IR cut filter | ∞ | 0.2100(TF) | 1.517(nf) | 64.167(vf) | | |
| 672 | | ∞ | 0.3780(GFP) | | | | |
| 680 | Image plane | ∞ | | | | | |

FIG. 28

| Aspherical parameters | | | | | |
|---|---|---|---|---|---|
| Surface# | 621 | 622 | 631 | 632 | 641 |
| K | 0.000000E+00 | 0.000000E+00 | 0.000000E+00 | 0.000000E+00 | 0.000000E+00 |
| $a_4$ | 3.925706E-02 | 7.962228E-02 | 6.233967E-02 | 1.036625E-01 | 1.406095E-01 |
| $a_6$ | -7.185804E-03 | -1.567705E-02 | -1.127028E-02 | -6.168490E-02 | -1.088588E+00 |
| $a_8$ | 1.080021E-03 | 4.125326E-03 | 5.710320E-04 | 3.683605E-02 | 8.468246E+00 |
| $a_{10}$ | -7.141300E-05 | -2.370350E-04 | 5.818250E-04 | -1.051724E-02 | -4.084750E+01 |
| $a_{12}$ | -9.874000E-06 | -1.399250E-04 | 1.218360E-04 | -5.671720E-04 | 9.854225E+01 |
| $a_{14}$ | 1.503000E-06 | 6.153100E-05 | -7.598800E-05 | 8.179550E-04 | -9.385188E+01 |
| $a_{16}$ | 0.000000E+00 | 0.000000E+00 | 0.000000E+00 | 0.000000E+00 | 0.000000E+00 |
| Surface# | 642 | 651 | 652 | 661 | 662 |
| K | 0.000000E+00 | -3.178524E+00 | -1.283694E-02 | -9.205424E+00 | 0.000000E+00 |
| $a_4$ | 3.582583E-01 | -4.148646E-01 | 4.706852E-01 | -1.116342E-01 | -4.792916E-02 |
| $a_6$ | -1.294188E+00 | 1.052378E+00 | 2.647423E-01 | 1.862180E-04 | -7.878379E-02 |
| $a_8$ | 2.615368E+00 | 1.029448E+00 | 2.375047E-01 | 2.386018E-02 | 9.032354E-02 |
| $a_{10}$ | 4.966210E-01 | -5.613943E+00 | 1.073630E-01 | 1.645938E-02 | -9.005209E-02 |
| $a_{12}$ | -7.897105E+00 | 4.262973E+00 | -1.232288E+00 | 1.797670E-03 | 6.018182E-02 |
| $a_{14}$ | 7.841359E+00 | 8.465792E-01 | 9.655941E-01 | -1.946263E-02 | -2.160111E-02 |
| $a_{16}$ | 0.000000E+00 | 0.000000E+00 | 0.000000E+00 | 7.019008E-03 | 3.052409E-03 |

FIG. 29

| \multicolumn{7}{c}{Effective focal length (EFL) = 1.115 mm, (Half field of view) = 80.932deg,} |
|---|---|---|---|---|---|---|
| \multicolumn{7}{c}{TTL (System length) = 9.179 mm, Fno = 2.43} |

| Surface # | | Radius (mm) | Thickness (mm) | Refractive index | Abbe number | Focus (mm) | Material |
|---|---|---|---|---|---|---|---|
| - | Object | ∞ | ∞ | | | | |
| 711 | 1st lens element | 72.2883 | 0.7103(T1) | 1.773(n1) | 49.613(v1) | -4.327(f1) | glass |
| 712 | | 3.1923 | 1.3524(G12) | | | | |
| 721 | 2nd lens element | -5.5748 | 1.4213(T2) | 1.642(n2) | 22.409(v2) | 5.385(f2) | plastic |
| 722 | | -2.3595 | 0.1597(G23) | | | | |
| 731 | 3rd lens element | -2.7120 | 1.7872(T3) | 1.535(n3) | 55.635(v3) | 8.415(f3) | plastic |
| 732 | | -2.0837 | 0.3708(G34-TA) | | | | |
| 700 | Aperture stop | ∞ | 0.0357(TA) | | | | |
| 741 | 4th lens element | 3.8052 | 1.1291(T4) | 1.535(n4) | 55.635(v4) | 1.505(f4) | plastic |
| 742 | | -0.9183 | 0.1154(G45) | | | | |
| 751 | 5th lens element | -0.3697 | 0.2523(T5) | 1.642(n5) | 22.409(v5) | -1.091(f5) | plastic |
| 752 | | -0.9838 | 0.0400(G56) | | | | |
| 761 | 6th lens element | 0.7084 | 0.6058(T6) | 1.535(n6) | 55.635(v6) | 1.651(f6) | plastic |
| 762 | | 2.4852 | 0.5000(G6F) | | | | |
| 771 | IR cut filter | ∞ | 0.2100(TF) | 1.517(nf) | 64.167(vf) | | |
| 772 | | ∞ | 0.4890(GFP) | | | | |
| 780 | Image plane | ∞ | | | | | |

FIG. 32

| Aspherical parameters | | | | | |
|---|---|---|---|---|---|
| Surface# | 721 | 722 | 731 | 732 | 741 |
| K | 0.000000E+00 | 0.000000E+00 | 0.000000E+00 | 0.000000E+00 | 0.000000E+00 |
| $a_4$ | 3.829353E-02 | 8.540074E-02 | 5.263841E-02 | 1.001308E-01 | 1.509876E-01 |
| $a_6$ | -6.618966E-03 | -1.633703E-02 | -5.929551E-03 | -7.467662E-02 | -1.335543E+00 |
| $a_8$ | 1.052713E-03 | 4.049543E-03 | -4.020400E-05 | 3.453139E-02 | 9.455261E+00 |
| $a_{10}$ | -5.866800E-05 | 8.110600E-05 | 9.350700E-05 | -5.246641E-03 | -4.085509E+01 |
| $a_{12}$ | -5.162000E-06 | -8.641600E-05 | 1.490580E-04 | 4.967380E-03 | 8.225500E+01 |
| $a_{14}$ | 2.410000E-07 | 1.866300E-05 | -4.557700E-05 | -4.905440E-03 | -5.473034E+01 |
| $a_{16}$ | 0.000000E+00 | 0.000000E+00 | 0.000000E+00 | 0.000000E+00 | 0.000000E+00 |
| Surface# | 742 | 751 | 752 | 761 | 762 |
| K | 0.000000E+00 | -3.178524E+00 | -1.283694E-02 | -9.205424E+00 | 0.000000E+00 |
| $a_4$ | 3.618931E-01 | -4.679085E-01 | 4.553069E-01 | -5.205888E-02 | -2.015240E-02 |
| $a_6$ | -1.431162E+00 | 1.071443E+00 | 2.877143E-01 | -1.755185E-02 | -9.494453E-02 |
| $a_8$ | 2.561711E+00 | 9.173306E-01 | 2.089531E-01 | 1.717668E-02 | 9.413640E-02 |
| $a_{10}$ | 4.990796E-01 | -5.693280E+00 | 8.490312E-02 | 1.033228E-02 | -8.842879E-02 |
| $a_{12}$ | -7.761981E+00 | 4.236959E+00 | -1.218070E+00 | 6.994204E-03 | 5.988541E-02 |
| $a_{14}$ | 8.185274E+00 | 1.262776E+00 | 9.851754E-01 | -1.661629E-02 | -2.202868E-02 |
| $a_{16}$ | 0.000000E+00 | 0.000000E+00 | 0.000000E+00 | 4.866101E-03 | 3.122888E-03 |

FIG. 33

| Effective focal length (EFL) = 1.290 mm, (Half field of view) = 80.932deg., TTL (System length) = 8.054 mm, Fno = 2.81 |||||||
|---|---|---|---|---|---|---|---|
| Surface # | | Radius (mm) | Thickness (mm) | Refractive index | Abbe number | Focus (mm) | Material |
| - | Object | ∞ | ∞ | | | | |
| 811 | 1st lens element | -74.3455 | 0.5161(T1) | 1.773(n1) | 49.613(v1) | -4.639(f1) | glass |
| 812 | | 3.7912 | 0.9058(G12) | | | | |
| 821 | 2nd lens element | -10.7473 | 1.6734(T2) | 1.642(n2) | 22.409(v2) | 5.123(f2) | plastic |
| 822 | | -2.6892 | 0.1406(G23) | | | | |
| 831 | 3rd lens element | -2.4514 | 1.2883(T3) | 1.535(n3) | 55.635(v3) | 15.881(f3) | plastic |
| 832 | | -2.2527 | 0.3694(G34-TA) | | | | |
| 800 | Aperture stop | ∞ | 0.1326(TA) | | | | |
| 841 | 4th lens element | 3.3427 | 0.5770(T4) | 1.535(n4) | 55.635(v4) | 1.466(f4) | plastic |
| 842 | | -0.9661 | 0.1550(G45) | | | | |
| 851 | 5th lens element | -0.3678 | 0.2586(T5) | 1.642(n5) | 22.409(v5) | -1.095(f5) | plastic |
| 852 | | -0.9756 | 0.0400(G56) | | | | |
| 861 | 6th lens element | 0.7278 | 0.3975(T6) | 1.535(n6) | 55.635(v6) | 1.696(f6) | plastic |
| 862 | | 2.9478 | 0.5000(G6F) | | | | |
| 871 | IR cut filter | ∞ | 0.2100(TF) | 1.517(nf) | 64.167(vf) | | |
| 872 | | ∞ | 0.8900(GFP) | | | | |
| 880 | Image plane | ∞ | | | | | |

FIG. 36

| Aspherical parameters | | | | | |
|---|---|---|---|---|---|
| Surface# | 821 | 822 | 831 | 832 | 841 |
| K | 0.000000E+00 | 0.000000E+00 | 0.000000E+00 | 0.000000E+00 | 0.000000E+00 |
| $a_4$ | 2.851859E-02 | 9.614195E-02 | 7.717485E-02 | 6.755496E-02 | -6.066037E-02 |
| $a_6$ | -5.182157E-03 | -2.064668E-02 | -1.051254E-02 | -7.522610E-02 | -1.294408E+00 |
| $a_8$ | 1.085915E-03 | 9.010635E-03 | -1.642318E-03 | 4.042415E-02 | 1.032947E+01 |
| $a_{10}$ | -8.825400E-05 | 2.636150E-04 | 3.039316E-03 | -1.376687E-02 | -6.398279E+01 |
| $a_{12}$ | -9.584000E-06 | -4.020030E-04 | 1.311173E-03 | 1.194263E-03 | 1.756026E+02 |
| $a_{14}$ | 1.111000E-06 | 8.611650E-04 | -1.033012E-03 | 3.323270E-04 | -1.974491E+02 |
| $a_{16}$ | 0.000000E+00 | 0.000000E+00 | 0.000000E+00 | 0.000000E+00 | 0.000000E+00 |
| Surface# | 842 | 851 | 852 | 861 | 862 |
| K | 0.000000E+00 | -3.178524E+00 | -1.283694E-02 | -9.205424E+00 | 0.000000E+00 |
| $a_4$ | 2.173882E-01 | -3.600333E-01 | 4.518192E-01 | -1.598858E-01 | 1.515254E-02 |
| $a_6$ | -1.267974E+00 | 7.644971E-01 | 1.570616E-02 | -5.457232E-02 | -1.795688E-01 |
| $a_8$ | 1.434845E+00 | 1.239986E+00 | 1.477837E-01 | -7.436257E-02 | 1.093304E-01 |
| $a_{10}$ | 1.266082E+00 | -6.153557E+00 | 6.746285E-01 | -4.298492E-02 | -7.515561E-02 |
| $a_{12}$ | -8.488993E+00 | 7.607464E+00 | -1.880203E+00 | 1.052130E-02 | 5.867988E-02 |
| $a_{14}$ | 7.756442E+00 | -1.182163E+00 | 1.249198E+00 | -7.061761E-02 | -2.307811E-02 |
| $a_{16}$ | 0.000000E+00 | 0.000000E+00 | 0.000000E+00 | 4.676233E-02 | 4.469377E-03 |

FIG. 37

| Effective focal length (EFL) = 1.172 mm, (Half field of view) = 80.932deg., TTL (System length) = 8.986 mm, Fno = 2.55 ||||||||
|---|---|---|---|---|---|---|---|
| Surface # | | Radius (mm) | Thickness (mm) | Refractive index | Abbe number | Focus (mm) | Material |
| - | Object | ∞ | ∞ | | | | |
| 911 | 1st lens element | 127.6818 | 0.4687(T1) | 1.773(n1) | 49.613(v1) | -5.208(f1) | glass |
| 912 | | 3.9080 | 1.4152(G12) | | | | |
| 921 | 2nd lens element | -4.7804 | 1.4975(T2) | 1.642(n2) | 22.409(v2) | 6.164(f2) | plastic |
| 922 | | -2.4424 | 0.2828(G23) | | | | |
| 931 | 3rd lens element | -2.5838 | 1.6332(T3) | 1.535(n3) | 55.635(v3) | 6.947(f3) | plastic |
| 932 | | -1.8623 | 0.4848(G34-TA) | | | | |
| 900 | Aperture stop | ∞ | 0.0489(TA) | | | | |
| 941 | 4th lens element | 3.2092 | 1.0372(T4) | 1.535(n4) | 55.635(v4) | 1.497(f4) | plastic |
| 942 | | -0.9497 | 0.1237(G45) | | | | |
| 951 | 5th lens element | -0.3703 | 0.2602(T5) | 1.642(n5) | 22.409(v5) | -1.079(f5) | plastic |
| 952 | | -1.0058 | 0.0400(G56) | | | | |
| 961 | 6th lens element | 0.7143 | 0.5025(T6) | 1.535(n6) | 55.635(v6) | 1.711(f6) | plastic |
| 962 | | 2.4351 | 0.5000(G6F) | | | | |
| 971 | IR cut filter | ∞ | 0.2100(TF) | 1.517(nf) | 64.167(vf) | | |
| 972 | | ∞ | 0.4806(GFP) | | | | |
| 980 | Image plane | ∞ | | | | | |

FIG. 40

| Aspherical parameters | | | | | |
|---|---|---|---|---|---|
| Surface# | 921 | 922 | 931 | 932 | 941 |
| K | 0.000000E+00 | 0.000000E+00 | 0.000000E+00 | 0.000000E+00 | 0.000000E+00 |
| $a_4$ | 3.851693E-02 | 8.454323E-02 | 6.326688E-02 | 1.046435E-01 | 1.453187E-01 |
| $a_6$ | -6.878133E-03 | -1.709380E-02 | -1.240296E-02 | -6.377760E-02 | -1.105177E+00 |
| $a_8$ | 1.106733E-03 | 4.693815E-03 | 8.088360E-04 | 3.584070E-02 | 8.249515E+00 |
| $a_{10}$ | -7.489300E-05 | -2.186890E-04 | 7.276970E-04 | -1.053300E-02 | -4.048880E+01 |
| $a_{12}$ | -1.098800E-05 | -1.743180E-04 | 1.005240E-04 | -3.921320E-04 | 1.012755E+02 |
| $a_{14}$ | 1.709000E-06 | 6.854400E-05 | -1.087940E-04 | 8.315570E-04 | -1.046190E+02 |
| $a_{16}$ | 0.000000E+00 | 0.000000E+00 | 0.000000E+00 | 0.000000E+00 | 0.000000E+00 |
| Surface# | 942 | 951 | 952 | 961 | 962 |
| K | 0.000000E+00 | -3.178524E+00 | -1.283694E-02 | -9.205424E+00 | 0.000000E+00 |
| $a_4$ | 3.464493E-01 | -3.893073E-01 | 4.768906E-01 | -1.155578E-01 | -5.306481E-02 |
| $a_6$ | -1.286872E+00 | 1.072923E+00 | 2.779299E-01 | -2.276120E-03 | -7.766034E-02 |
| $a_8$ | 2.633030E+00 | 1.053207E+00 | 2.550813E-01 | 2.178783E-02 | 9.190699E-02 |
| $a_{10}$ | 4.825954E-01 | -5.553205E+00 | 1.114067E-01 | 1.814815E-02 | -9.011355E-02 |
| $a_{12}$ | -7.919333E+00 | 4.345742E+00 | -1.245181E+00 | 3.721801E-03 | 5.983184E-02 |
| $a_{14}$ | 7.985825E+00 | 8.030992E-01 | 9.440692E-01 | -1.882144E-02 | -2.164802E-02 |
| $a_{16}$ | 0.000000E+00 | 0.000000E+00 | 0.000000E+00 | 6.444238E-03 | 3.231826E-03 |

FIG. 41

| Effective focal length (EFL) = 0.988 mm, (Half field of view) = 80.932deg., TTL (System length) = 10.331 mm, Fno = 2.15 ||||||||
|---|---|---|---|---|---|---|---|
| Surface # | | Radius (mm) | Thickness (mm) | Refractive index | Abbe number | Focus (mm) | Material |
| - | Object | ∞ | ∞ | | | | |
| 1011 | 1st lens element | -72.5014 | 0.7322(T1) | 1.773(n1) | 49.613(v1) | -4.694(f1) | glass |
| 1012 | | 3.8489 | 1.7333(G12) | | | | |
| 1021 | 2nd lens element | -15.6630 | 1.4643(T2) | 1.642(n2) | 22.409(v2) | 6.617(f2) | plastic |
| 1022 | | -3.4873 | 0.3048(G23) | | | | |
| 1031 | 3rd lens element | -2.8744 | 2.0650(T3) | 1.535(n3) | 55.635(v3) | 9.392(f3) | plastic |
| 1032 | | -2.2889 | 0.3639(G34-TA) | | | | |
| 1000 | Aperture stop | ∞ | -0.0086(TA) | | | | |
| 1041 | 4th lens element | 3.0990 | 1.3229(T4) | 1.535(n4) | 55.635(v4) | 1.518(f4) | plastic |
| 1042 | | -0.9399 | 0.1156(G45) | | | | |
| 1051 | 5th lens element | -0.3635 | 0.2560(T5) | 1.642(n5) | 22.409(v5) | -1.034(f5) | plastic |
| 1052 | | -1.0154 | 0.0400(G56) | | | | |
| 1061 | 6th lens element | 0.7069 | 1.3326(T6) | 1.535(n6) | 55.635(v6) | 1.373(f6) | plastic |
| 1062 | | 6.0452 | 0.3000(G6F) | | | | |
| 1071 | IR cut filter | ∞ | 0.2100(TF) | 1.517(nf) | 64.167(vf) | | |
| 1072 | | ∞ | 0.0994(GFP) | | | | |
| 1080 | Image plane | ∞ | | | | | |

FIG. 44

| Aspherical parameters | | | | | |
|---|---|---|---|---|---|
| Surface# | 1021 | 1022 | 1031 | 1032 | 1041 |
| K | 0.000000E+00 | 0.000000E+00 | 0.000000E+00 | 0.000000E+00 | 0.000000E+00 |
| $a_4$ | 4.123289E-02 | 7.375762E-02 | 5.781072E-02 | 9.327970E-02 | 5.540505E-02 |
| $a_6$ | -7.202246E-03 | -1.608680E-02 | -8.596351E-03 | -9.132100E-02 | -7.948205E-01 |
| $a_8$ | 1.207138E-03 | 5.680796E-03 | 2.672236E-03 | 4.530484E-02 | 6.650109E+00 |
| $a_{10}$ | -3.344700E-05 | -1.024970E-04 | 5.329930E-04 | -5.498343E-03 | -4.166609E+01 |
| $a_{12}$ | -9.207000E-06 | -7.562200E-05 | 2.855000E-06 | -7.890000E-05 | 1.434239E+02 |
| $a_{14}$ | -2.100000E-07 | 1.300410E-04 | -3.560700E-05 | -2.147909E-03 | -1.945337E+02 |
| $a_{16}$ | 0.000000E+00 | 0.000000E+00 | 0.000000E+00 | 0.000000E+00 | 0.000000E+00 |
| Surface# | 1042 | 1051 | 1052 | 1061 | 1062 |
| K | 0.000000E+00 | -3.178524E+00 | -1.283694E-02 | -9.205424E+00 | 0.000000E+00 |
| $a_4$ | 3.112655E-01 | -3.751629E-01 | 4.827827E-01 | -1.312874E-01 | 4.466853E-03 |
| $a_6$ | -1.173214E+00 | 1.073167E+00 | 1.567894E-01 | 6.149094E-02 | -1.548485E-02 |
| $a_8$ | 2.793607E+00 | 9.914851E-01 | 2.249703E-01 | 2.521482E-02 | 7.078976E-02 |
| $a_{10}$ | 2.387797E-01 | -5.464180E+00 | 1.304056E-01 | -7.619308E-03 | -1.060763E-01 |
| $a_{12}$ | -8.608919E+00 | 4.442708E+00 | -1.053290E+00 | 1.900038E-03 | 6.686989E-02 |
| $a_{14}$ | 8.842672E+00 | 4.633856E-01 | 8.247751E-01 | -1.123440E-02 | -1.983911E-02 |
| $a_{16}$ | 0.000000E+00 | 0.000000E+00 | 0.000000E+00 | 4.990610E-03 | 2.280751E-03 |

FIG. 45

| Embodiment | 1st | 2nd | 3rd | 4th | 5th | 6th | 7th | 8th | 9th | 10th |
|---|---|---|---|---|---|---|---|---|---|---|
| T1 | 0.399 | 0.402 | 0.466 | 0.406 | 0.714 | 0.718 | 0.710 | 0.516 | 0.469 | 0.732 |
| G12 | 1.171 | 1.072 | 2.582 | 1.954 | 1.433 | 1.493 | 1.352 | 0.906 | 1.415 | 1.733 |
| T2 | 1.671 | 2.051 | 1.343 | 1.291 | 1.428 | 1.436 | 1.421 | 1.673 | 1.497 | 1.464 |
| G23 | 0.096 | 0.055 | 0.157 | 0.397 | 0.196 | 0.294 | 0.160 | 0.141 | 0.283 | 0.305 |
| T3 | 0.987 | 2.391 | 2.232 | 1.767 | 1.866 | 1.678 | 1.787 | 1.288 | 1.633 | 2.065 |
| G34 | 0.397 | 0.407 | 0.459 | 0.487 | 0.520 | 0.545 | 0.406 | 0.502 | 0.534 | 0.355 |
| T4 | 0.975 | 0.976 | 1.304 | 1.393 | 1.189 | 1.239 | 1.129 | 0.577 | 1.037 | 1.323 |
| G45 | 0.120 | 0.204 | 0.119 | 0.121 | 0.113 | 0.119 | 0.115 | 0.155 | 0.124 | 0.116 |
| T5 | 0.351 | 0.322 | 0.262 | 0.251 | 0.255 | 0.256 | 0.252 | 0.259 | 0.260 | 0.256 |
| G56 | 0.040 | 0.040 | 0.040 | 0.040 | 0.040 | 0.040 | 0.040 | 0.040 | 0.040 | 0.040 |
| T6 | 0.631 | 0.750 | 0.766 | 1.016 | 0.597 | 0.557 | 0.606 | 0.398 | 0.503 | 1.333 |
| BFL | 1.090 | 0.910 | 0.814 | 0.618 | 1.112 | 1.088 | 1.199 | 1.600 | 1.191 | 0.609 |
| EFL | 0.998 | 1.006 | 1.070 | 1.016 | 1.121 | 1.128 | 1.115 | 1.290 | 1.172 | 0.988 |
| TTL | 7.929 | 9.581 | 10.543 | 9.742 | 9.463 | 9.464 | 9.179 | 8.054 | 8.986 | 10.331 |
| ALT | 5.014 | 6.892 | 6.373 | 6.125 | 6.048 | 5.885 | 5.906 | 4.711 | 5.399 | 7.173 |
| AAG | 1.825 | 1.778 | 3.356 | 2.998 | 2.302 | 2.491 | 2.074 | 1.743 | 2.395 | 2.549 |
| SL | 3.312 | 3.319 | 3.333 | 3.439 | 3.363 | 3.351 | 3.377 | 3.161 | 3.203 | 3.668 |
| SL/TTL | 0.418 | 0.346 | 0.316 | 0.353 | 0.355 | 0.354 | 0.368 | 0.392 | 0.356 | 0.355 |
| TTL/(T3+G34) | 5.731 | 3.424 | 3.918 | 4.323 | 3.966 | 4.256 | 4.184 | 4.499 | 4.147 | 4.269 |
| T3/T5 | 2.808 | 7.426 | 8.511 | 7.029 | 7.318 | 6.552 | 7.085 | 4.982 | 6.277 | 8.066 |
| AAG/T2 | 1.092 | 0.867 | 2.500 | 2.322 | 1.613 | 1.734 | 1.459 | 1.042 | 1.600 | 1.741 |
| EFL/T1 | 2.500 | 2.500 | 2.294 | 2.499 | 1.571 | 1.571 | 1.570 | 2.500 | 2.500 | 1.349 |
| ALT/EFL | 5.024 | 6.851 | 5.956 | 6.029 | 5.395 | 5.217 | 5.297 | 3.652 | 4.607 | 7.260 |
| (G12+G23)/T5 | 3.609 | 3.500 | 10.441 | 9.351 | 6.388 | 6.973 | 5.994 | 4.047 | 6.527 | 7.961 |
| EFL/(G34+G56) | 2.284 | 2.251 | 2.144 | 1.929 | 2.002 | 1.927 | 2.497 | 2.380 | 2.043 | 2.500 |
| ALT/(T1+T4) | 3.648 | 4.999 | 3.600 | 3.403 | 3.178 | 3.006 | 3.211 | 4.310 | 3.585 | 3.490 |
| T6/(G34+G45) | 1.220 | 1.227 | 1.325 | 1.671 | 0.942 | 0.839 | 1.161 | 0.605 | 0.764 | 2.830 |
| ALT/(T3+T5) | 3.748 | 2.540 | 2.555 | 3.035 | 2.851 | 3.042 | 2.896 | 3.045 | 2.852 | 3.090 |
| (G12+G45)/T4 | 1.324 | 1.307 | 2.072 | 1.489 | 1.300 | 1.300 | 1.300 | 1.839 | 1.484 | 1.398 |
| T3/(G23+G34) | 2.000 | 5.174 | 3.626 | 2.000 | 2.606 | 2.000 | 3.156 | 2.005 | 2.000 | 3.129 |
| (T2+T5)/EFL | 2.026 | 2.359 | 1.500 | 1.518 | 1.501 | 1.500 | 1.501 | 1.498 | 1.500 | 1.741 |
| ALT/(T4+T5+T6) | 2.562 | 3.365 | 2.733 | 2.302 | 2.963 | 2.867 | 2.972 | 3.820 | 3.000 | 2.464 |
| T2/T1 | 4.186 | 5.096 | 2.878 | 3.177 | 2.000 | 2.000 | 2.001 | 3.243 | 3.195 | 2.000 |

FIG. 46

OPTICAL IMAGING LENS

CROSS REFERENCE TO RELATED APPLICATION

This application claims priority to P.R.C. Patent Application No. 201710035161.8, titled "Optical Imaging Lens," filed Jan. 17, 2017, with the State Intellectual Property Office of the People's Republic of China (SIPO), which is incorporated herein by its entirety.

TECHNICAL FIELD

The present disclosure relates to an optical imaging lens, and particularly, relates to an optical imaging lens having six lens elements.

BACKGROUND

The ever-increasing demand for smaller sized mobile devices, such as cell phones, digital cameras, tablet computers, personal digital assistants (PDAs), virtual reality (VR) tracker, etc. has triggered a corresponding need for smaller sized photography modules contained within the device, such as optical imaging lenses, module housing units, image sensors, etc. Size reductions may be achieved from various aspects of the mobile devices, which may include not only the charge coupled device (CCD) and the complementary metal-oxide semiconductor (CMOS), but also the optical imaging lens mounted therein. When reducing the size of the optical imaging lens, however, achieving good optical characteristics may become a challenging problem. Furthermore, achieving a high view angle and a great aperture size are important in certain applications, such as where a photography module is used in vehicles.

In light of the above issues, designing an optical imaging lens with a shorter length is not easily achieved by merely decreasing the size of each element proportionally, especially for an optical imaging lens mounted with six lens elements, in which the distance between an object-side surface of the first lens element to an imaging plane along with an optical axis may be great. Additionally, factors such as material nature, production difficulty, assembly yield, and so forth are crucial to the application of the design. Accordingly, there is a need for optical imaging lenses which are capable of comprising six lens elements therein, with a shorter length, wider view angle, while also having good optical characteristics.

SUMMARY

The present disclosure provides for optical imaging lenses. By controlling the convex or concave shape of the surfaces of the lens elements and satisfying at least two inequalities, the length of the optical imaging lens may be shortened while maintaining good optical characteristics and system functionality.

In an example embodiment, an optical imaging lens may comprise an aperture stop and six lens elements, here called first, second, third, fourth, fifth and sixth lens elements and positioned sequentially from an object side to an image side along an optical axis. Each of the first, second, third, fourth, fifth and sixth lens elements has refracting power, an object-side surface facing toward the object side and an image-side surface facing toward the image side.

In the specification, parameters used here are: a central thickness of the first lens element, represented by T1, an air gap between the first lens element and the second lens element along the optical axis, represented by G12, a central thickness of the second lens element, represented by T2, an air gap between the second lens element and the third lens element along the optical axis, represented by G23, a central thickness of the third lens element, represented by T3, the distance between the aperture stop and the object-side surface of the next lens element along the optical axis, represented by TA, an air gap between the third lens element and the fourth lens element along the optical axis, represented by G34, a central thickness of the fourth lens element, represented by T4, an air gap between the fourth lens element and the fifth lens element along the optical axis, represented by G45, a central thickness of the fifth lens element, represented by T5, an air gap between the fifth lens element and the sixth lens element along the optical axis, represented by G56, a central thickness of the sixth lens element, represented by T6, a distance between the image-side surface of the sixth lens element and the object-side surface of a filtering unit along the optical axis, represented by G6F, a central thickness of the filtering unit along the optical axis, represented by TF, a distance between the image-side surface of the filtering unit and an image plane along the optical axis, represented by GFP, a focusing length of the first lens element, represented by f1, a focusing length of the second lens element, represented by f2, a focusing length of the third lens element, represented by f3, a focusing length of the fourth lens element, represented by f4, a focusing length of the fifth lens element, represented by f5, a focusing length of the sixth lens element, represented by f6, the refracting power of the first lens element, represented by n1, the refracting power of the second lens element, represented by n2, the refracting power of the third lens element, represented by n3, the refracting power of the fourth lens element, represented by n4, the refracting power of the fifth lens element, represented by n5, the refracting power of the sixth lens element, represented by n6, the refracting power of the filtering unit, represented by nf, an abbe number of the first lens element, represented by v1, an abbe number of the second lens element, represented by v2, an abbe number of the third lens element, represented by v3, an abbe number of the fourth lens element, represented by v4, an abbe number of the fifth lens element, represented by v5, an abbe number of the sixth lens element, represented by v6, an effective focal length of the optical imaging lens, represented by EFL or f, a distance between the object-side surface of the first lens element and the image-side surface of the sixth lens element along the optical axis, represented by TL, a distance between the aperture stop and the image plane along the optical axis, represented by SL, a distance between the object-side surface of the first lens element and the image plane along the optical axis, represented by TTL, a sum of the central thicknesses of all six lens elements, i.e. a sum of T1, T2, T3, T4, T5 and T6, represented by ALT, a sum of all five air gaps from the first lens element to the sixth lens element along the optical axis, i.e. a sum of G12, G23, G34, G45 and G56, represented by AAG, and a back focal length of the optical imaging lens, which is defined as the distance from the image-side surface of the sixth lens element to the image plane along the optical axis, i.e. a sum of G6F, TF and GFP, and represented by BFL.

In an aspect of the present disclosure, in the optical imaging lens, the image-side surface of the first lens element may comprise a concave portion in a vicinity of the optical axis and a concave portion in a vicinity of a periphery of the first lens element, the image-side surface of the second lens element may comprise a convex portion in a vicinity of the optical axis, the object-side surface of the third lens element may comprise a concave portion in a vicinity of the optical axis, and the image-side surface of the third lens element may comprise a convex portion in a vicinity of the optical axis, the image-side surface of the fourth lens element may comprise a convex portion in a vicinity of the optical axis, the object-side surface of the fifth lens element may comprise a concave portion in a vicinity of the optical axis, and the image-side surface of the fifth lens element may comprise a convex portion in a vicinity of the optical axis, and the image-side surface of the sixth lens element may comprise a concave portion in a vicinity of the optical axis. The optical imaging lens may comprise no other lenses having refracting power beyond the six lens elements, and satisfies at least these two inequalities:

$SL/TTL \leq 0.75$  Inequality (1); and $TTL/(T3+G34) \leq 7.3$  Inequality (2).

In another example embodiment, other inequality(s), such as those relating to the ratio among parameters could be taken into consideration. For example:

$T3/T5 \geq 2.0$  Inequality (3);

$AAG/T2 \leq 2.5$  Inequality (4);

$EFL/T1 \leq 2.5$  Inequality (5);

$ALT/EFL \geq 3.0$  Inequality (6);

$(G12+G23)/T5 \geq 3.5$  Inequality (7);

$EFL/(G34+G56) \leq 2.5$  Inequality (8);

$ALT/(T1+T4) \geq 3.0$  Inequality (9);

$T6/(G34+G45) \leq 3.0$  Inequality (10);

$ALT/(T3+T5) \leq 4.0$  Inequality (11);

$(G12+G45)/T4 \geq 1.3$  Inequality (12);

$T3/(G23+G34) \geq 2.0$  Inequality (13);

$(T2+T5)/EFL \geq 1.4$  Inequality (14);

$ALT/(T4+T5+T6) \geq 2.3$  Inequality (15); and/or $T2/T1 \geq 2.0$  Inequality (16).

In some example embodiments, more details about the convex or concave surface structure, refracting power, etc. could be incorporated for one specific lens element or broadly for plural lens elements to enhance the control for the system performance and/or resolution. For example, in an example embodiment, the first lens element may have negative refracting power. It is noted that the details listed here could be incorporated in example embodiments if no inconsistency occurs.

The above example embodiments are not limited and could be selectively incorporated in other embodiments described herein.

Through controlling the convex or concave shape of the surfaces and at lease two inequalities, the optical imaging lens in example embodiments achieve good optical characteristics and effectively shorten the length of the optical imaging lens.

BRIEF DESCRIPTION OF THE DRAWINGS

Example embodiments will be more readily understood from the following detailed description when read in conjunction with the appended drawing, in which:

FIG. 1 depicts a cross-sectional view of one single lens element according to the present disclosure;

FIG. 2 depicts a cross-sectional view showing the relation between the shape of a portion and the position where a collimated ray meets the optical axis;

FIG. 3 depicts a cross-sectional view showing the relation between the shape of a portion and the effective radius of a first example;

FIG. 4 depicts a cross-sectional view showing the relation between the shape of a portion and the effective radius of a second example;

FIG. 5 depicts a cross-sectional view showing the relation between the shape of a portion and the effective radius of a third example;

FIG. 8 depicts a table of optical data for each lens element of a first embodiment of an optical imaging lens according to the present disclosure;

FIG. 9 depicts a table of aspherical data of a first embodiment of the optical imaging lens according to the present disclosure;

FIG. 12 depicts a table of optical data for each lens element of the optical imaging lens of a second embodiment of the present disclosure;

FIG. 13 depicts a table of aspherical data of a second embodiment of the optical imaging lens according to the present disclosure;

FIG. 16 depicts a table of optical data for each lens element of the optical imaging lens of a third embodiment of the present disclosure;

FIG. 17 depicts a table of aspherical data of a third embodiment of the optical imaging lens according to the present disclosure;

FIG. 20 depicts a table of optical data for each lens element of the optical imaging lens of a fourth embodiment of the present disclosure;

FIG. 21 depicts a table of aspherical data of a fourth embodiment of the optical imaging lens according to the present disclosure;

FIG. 24 depicts a table of optical data for each lens element of the optical imaging lens of a fifth embodiment of the present disclosure;

FIG. 25 depicts a table of aspherical data of a fifth embodiment of the optical imaging lens according to the present disclosure;

FIG. 28 depicts a table of optical data for each lens element of the optical imaging lens of a sixth embodiment of the present disclosure;

FIG. 29 depicts a table of aspherical data of a sixth embodiment of the optical imaging lens according to the present disclosure;

FIG. 32 depicts a table of optical data for each lens element of a seventh embodiment of an optical imaging lens according to the present disclosure;

FIG. 33 depicts a table of aspherical data of a seventh embodiment of the optical imaging lens according to the present disclosure;

FIG. 36 depicts a table of optical data for each lens element of the optical imaging lens of an eighth embodiment of the present disclosure;

FIG. 37 depicts a table of aspherical data of an eighth embodiment of the optical imaging lens according to the present disclosure;

FIG. 40 depicts a table of optical data for each lens element of a ninth embodiment of an optical imaging lens according to the present disclosure;

FIG. 41 depicts a table of aspherical data of a ninth embodiment of the optical imaging lens according to the present disclosure;

FIG. 44 depicts a table of optical data for each lens element of the optical imaging lens of a tenth embodiment of the present disclosure;

FIG. 45 depicts a table of aspherical data of a tenth embodiment of the optical imaging lens according to the present disclosure;

FIG. 46 depicts a table for the values of T1, G12, T2, G23, T3, G34, T4, G45, T5, G56, T6, BFL, EFL, TTL, ALT, AAG, SL, SL/TTL, TTL/(T3+G34), T3/T5, AAG/T2, EFL/T1, ALT/EFL, (G12+G23)/T5, EFL/(G34+G56), ALT/(T1+T4), T6/(G34+G45), ALT/(T3+T5), (G12+G45)/T4, T3/(G23+G34), (T2+T5)/EFL, ALT/(T4+T5+T6) and T2/T1 of all ten example embodiments.

DETAILED DESCRIPTION

Figure 6:
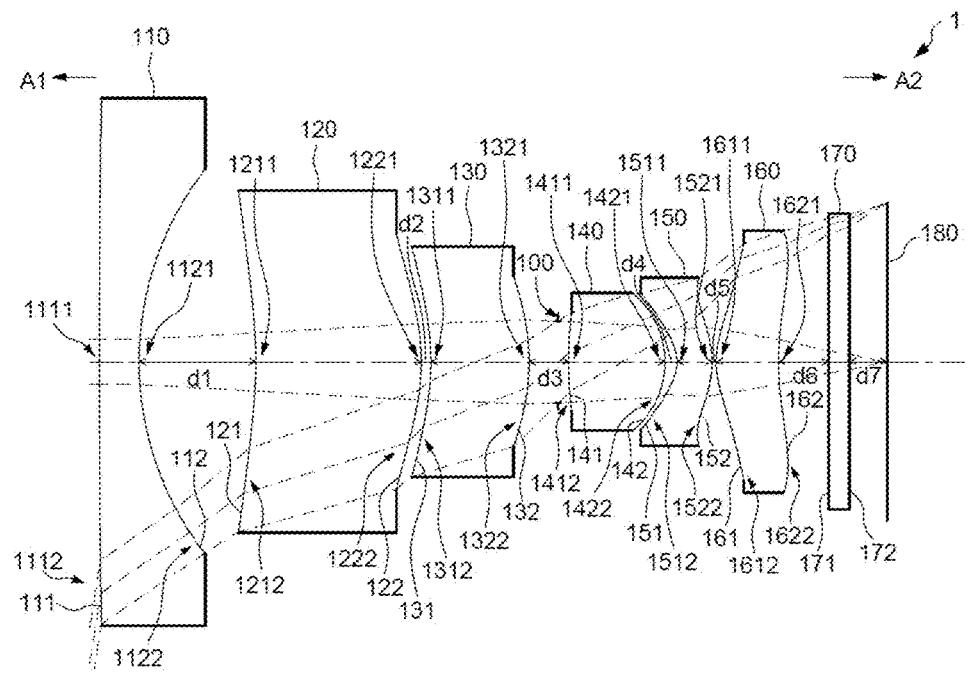
FIG. 6 depicts a cross-sectional view of a first embodiment of an optical imaging lens having six lens elements according to the present disclosure.

For a more complete understanding of the present disclosure and its advantages, reference is now made to the following description taken in conjunction with the accompanying drawings, in which like reference numbers indicate like features. Persons having ordinary skill in the art will understand other varieties for implementing example embodiments, including those described herein. The drawings are not limited to specific scale and similar reference numbers are used for representing similar elements. As used in the disclosures and the appended claims, the terms "example embodiment," "exemplary embodiment," and "present embodiment" do not necessarily refer to a single embodiment, although it may, and various example embodiments may be readily combined and interchanged, without departing from the scope or spirit of the present disclosure. Furthermore, the terminology as used herein is for the purpose of describing example embodiments only and is not intended to be a limitation of the disclosure. In this respect, as used herein, the term "in" may include "in" and "on", and the terms "a", "an" and "the" may include singular and plural references. Furthermore, as used herein, the term "by" may also mean "from", depending on the context. Furthermore, as used herein, the term "if" may also mean "when" or "upon", depending on the context. Furthermore, as used herein, the words "and/or" may refer to and encompass any and all possible combinations of one or more of the associated listed items.

In the present specification, the description "a lens element having positive refracting power (or negative refracting power)" means that the paraxial refracting power of the lens element in Gaussian optics is positive (or negative). The description "An object-side (or image-side) surface of a lens element" only includes a specific region of that surface of the lens element where imaging rays are capable of passing through that region, namely the clear aperture of the surface. The aforementioned imaging rays can be classified into two types, chief ray Lc and marginal ray Lm. Taking a lens element depicted in FIG. 1 as an example, the lens element is rotationally symmetric, where the optical axis I is the axis of symmetry. The region A of the lens element is defined as "a portion in a vicinity of the optical axis", and the region C of the lens element is defined as "a portion in a vicinity of a periphery of the lens element". Besides, the lens element may also have an extending portion E extended radially and outwardly from the region C, namely the portion outside of the clear aperture of the lens element. The extending portion E is usually used for physically assembling the lens element into an optical imaging lens system. Under normal circumstances, the imaging rays would not pass through the extending portion E because those imaging rays only pass through the clear aperture. The structures and shapes of the aforementioned extending portion E are only examples for technical explanation, the structures and shapes of lens elements should not be limited to these examples. Note that the extending portions of the lens element surfaces depicted in the following embodiments are partially omitted.

The following criteria are provided for determining the shapes and the portions of lens element surfaces set forth in the present specification. These criteria mainly determine the boundaries of portions under various circumstances including the portion in a vicinity of the optical axis, the portion in a vicinity of a periphery of a lens element surface, and other types of lens element surfaces such as those having multiple portions.

FIG. 1 is a radial cross-sectional view of a lens element. Before determining boundaries of those described portions, two referential points should be defined first, central point and transition point. The central point of a surface of a lens element is a point of intersection of that surface and the optical axis. The transition point is a point on a surface of a lens element, where the tangent line of that point is perpendicular to the optical axis. Additionally, if multiple transition points appear on one single surface, then these transition points are sequentially named along the radial direction of the surface with numbers starting from the first transition point. For instance, the first transition point (closest one to the optical axis), the second transition point, and the Nth transition point (farthest one to the optical axis within the scope of the clear aperture of the surface). The portion of a surface of the lens element between the central point and the first transition point is defined as the portion in a vicinity of the optical axis. The portion located radially outside of the Nth transition point (but still within the scope of the clear aperture) is defined as the portion in a vicinity of a periphery of the lens element. In some embodiments, there are other portions existing between the portion in a vicinity of the optical axis and the portion in a vicinity of a periphery of the lens element; the numbers of portions depend on the numbers of the transition point(s). In addition, the radius of the clear aperture (or a so-called effective radius) of a surface is defined as the radial distance from the optical axis I to a point of intersection of the marginal ray Lm and the surface of the lens element.

Referring to FIG. 2, determining whether the shape of a portion is convex or concave depends on whether a collimated ray passing through that portion converges or diverges. That is, while applying a collimated ray to a portion to be determined in terms of shape, the collimated ray passing through that portion will be bended and the ray itself or its extension line will eventually meet the optical axis. The shape of that portion can be determined by whether the ray or its extension line meets (intersects) the optical axis (focal point) at the object-side or image-side. For instance, if the ray itself intersects the optical axis at the image side of the lens element after passing through a portion, i.e. the focal point of this ray is at the image side (see point R in FIG. 2), the portion will be determined as having a convex shape. On the contrary, if the ray diverges after passing through a portion, the extension line of the ray intersects the optical axis at the object side of the lens element, i.e. the focal point of the ray is at the object side (see point M in FIG. 2), that portion will be determined as having a concave shape. Therefore, referring to FIG. 2, the portion between the central point and the first transition point has a convex shape, the portion located radially outside of the first transition point has a concave shape, and the first transition point is the point where the portion having a convex shape changes to the portion having a concave shape, namely the border of two adjacent portions. Alternatively, there is another common way for a person with ordinary skill in the art to tell whether a portion in a vicinity of the optical axis has a convex or concave shape by referring to the sign of an "R" value, which is the (paraxial) radius of curvature of a lens surface. The R value which is commonly used in conventional optical design software such as Zemax and CodeV. The R value usually appears in the lens data sheet in the software. For an object-side surface, positive R means that the object-side surface is convex, and negative R means that the object-side surface is concave. Conversely, for an image-side surface, positive R means that the image-side surface is concave, and negative R means that the image-side surface is convex. The result found by using this method should be consistent as by using the other way mentioned above, which determines surface shapes by referring to whether the focal point of a collimated ray is at the object side or the image side.

For none transition point cases, the portion in a vicinity of the optical axis is defined as the portion between 0~50% of the effective radius (radius of the clear aperture) of the surface, whereas the portion in a vicinity of a periphery of the lens element is defined as the portion between 50~100% of effective radius (radius of the clear aperture) of the surface.

Referring to the first example depicted in FIG. 3, only one transition point, namely a first transition point, appears within the clear aperture of the image-side surface of the lens element. Portion I is a portion in a vicinity of the optical axis, and portion II is a portion in a vicinity of a periphery of the lens element. The portion in a vicinity of the optical axis is determined as having a concave surface due to the R value at the image-side surface of the lens element is positive. The shape of the portion in a vicinity of a periphery of the lens element is different from that of the radially inner adjacent portion, i.e. the shape of the portion in a vicinity of a periphery of the lens element is different from the shape of the portion in a vicinity of the optical axis; the portion in a vicinity of a periphery of the lens element has a convex shape.

Referring to the second example depicted in FIG. 4, a first transition point and a second transition point exist on the object-side surface (within the clear aperture) of a lens element. In which portion I is the portion in a vicinity of the optical axis, and portion III is the portion in a vicinity of a periphery of the lens element. The portion in a vicinity of the optical axis has a convex shape because the R value at the object-side surface of the lens element is positive. The portion in a vicinity of a periphery of the lens element (portion III) has a convex shape. What is more, there is another portion having a concave shape existing between the first and second transition point (portion II).

Referring to a third example depicted in FIG. 5, no transition point exists on the object-side surface of the lens element. In this case, the portion between 0~50% of the effective radius (radius of the clear aperture) is determined as the portion in a vicinity of the optical axis, and the portion between 50~100% of the effective radius is determined as the portion in a vicinity of a periphery of the lens element. The portion in a vicinity of the optical axis of the object-side surface of the lens element is determined as having a convex shape due to its positive R value, and the portion in a vicinity of a periphery of the lens element is determined as having a convex shape as well.

In the present disclosure, examples of an optical imaging lens which is a prime lens are provided. Example embodiments of an optical imaging lens may comprise a first lens element, a second lens element, a third lens element, a fourth lens element, a fifth lens element and a sixth lens element. Each of the lens elements may comprise refracting power, an object-side surface facing toward an object side and an image-side surface facing toward an image side and a central thickness defined along the optical axis. These lens elements may be arranged sequentially from the object side to the image side along an optical axis, and example embodiments of the lens may comprise no other lenses having refracting power beyond the six lens elements. In an example embodiment: the image-side surface of the first lens element may comprise a concave portion in a vicinity of the optical axis and a concave portion in a vicinity of a periphery of the first lens element, the image-side surface of the second lens element may comprise a convex portion in a vicinity of the optical axis, the object-side surface of the third lens element may comprise a concave portion in a vicinity of the optical axis, and the image-side surface of the third lens element may comprise a convex portion in a vicinity of the optical axis, the image-side surface of the fourth lens element may comprise a convex portion in a vicinity of the optical axis, the object-side surface of the fifth lens element may comprise a concave portion in a vicinity of the optical axis, and the image-side surface of the fifth lens element may comprise a convex portion in a vicinity of the optical axis, and the image-side surface of the sixth lens element may comprise a concave portion in a vicinity of the optical axis. The optical imaging lens satisfies at least these two inequalities:

$SL/TTL \leq 0.75$                              Inequality (1); and $TTL/(T3+G34) \leq 7.3$                        Inequality (2).

Preferably, the lens elements are designed in light of the optical characteristics and the length of the optical imaging lens. For example, the negative refracting power of the first lens element, the concave portion in a vicinity of the optical axis and the concave portion in a vicinity of the periphery formed on the image-side surface of the first lens element may assist in collecting light with higher incident angle. Together with the convex portion in a vicinity of the optical axis formed on the image-side surface of the second lens element, the concave portion in a vicinity of the optical axis formed on the object-side surface of the third lens element, the convex portion in a vicinity of the optical axis formed on the image-side surface of the third lens element, the convex portion in a vicinity of the optical axis formed on the image-side surface of the fourth lens element, the concave portion in a vicinity of the optical axis formed on the object-side surface of the fifth lens element, the convex portion in a vicinity of the optical axis formed on the image-side surface of the fifth lens element and the concave portion in a vicinity of the optical axis formed on the image-side surface of the sixth lens element, the abberations may be properly adjusted, the length of the optical imaging lens may be reduced and meanwhile the imaging quality, such as clarity of the image, of the optical imaging lens may be enhanced.

Further, when the ratio of the distance from the aperture stop to the image plane along the optical axis to the distance from the object-side surface of the first lens element to the image plane along the optical axis is less or equals to 0.75, the half field of view angle may be increased. Preferably, the ratio mentioned here falls within 0.3~0.75.

Additionally, values of other parameters may be controlled to assist in designing optical imaging lenses with good optical characters and a short length. To shorten the length of the optical imaging lens, the thickness of the lens elements and/or the air gaps between the lens elements are required optionally for shorter distances; however, considering the difficulty to achieve the smaller dimensions of the optical imaging lens set forth herein while maintaining imaging quality, the optical imaging lens may be better configured if it satisfies Inequality (2) and/or Inequalities (3)~(16). The value of TTL/(T3+G34) may preferably be within about 3.0~7.3; the value of T3/T5 may preferably be within 2.0~8.6; the value of AAG/T2 may preferably be within about 0.5~2.5; the value of EFL/T1 may preferably be within about 1.0~2.5; the value of ALT/EFL may preferably be within about 3.0~7.5; the value of (G12+G23)/T5 may preferably be within about 3.5~10.5; the value of EFL/(G34+G56) may preferably be within about 1.5~2.5; the value of ALT/(T1+T4) may preferably be within about 3.0~5.0; the value of T6/(G34+G45) may preferably be within about 0.5~3.0; the value of ALT/(T3+T5) may preferably be within about 2.5~4.0; the value of (G12+G45)/T4 may preferably be within about 1.3~2.5; the value of T3/(G23+G34) may preferably be within about 2.0~5.5; the value of (T2+T5)/EFL may preferably be within about 1.4~2.6; the value of ALT/(T4+T5+T6) may preferably be within about 2.3~4.0; and the value of T2/T1 may preferably be within about 2.0~5.5.

In light of the unpredictability in an optical system, in the present disclosure, satisfying these inequalities listed above may result in shortening the length of the optical imaging lens, lowering the f-number, enlarging the shot angle, promoting the imaging quality and/or increasing the yield in the assembly process.

When implementing example embodiments, more details about the convex or concave surface or refracting power could be incorporated for one specific lens element or broadly for plural lens elements to enhance the control for the system performance and/or resolution, or promote the yield. For example, in an exemple embodiment, the first lens element may have negative refracting power. It is noted that the details listed here could be incorporated in example embodiments if no inconsistency occurs.

Figure 7:
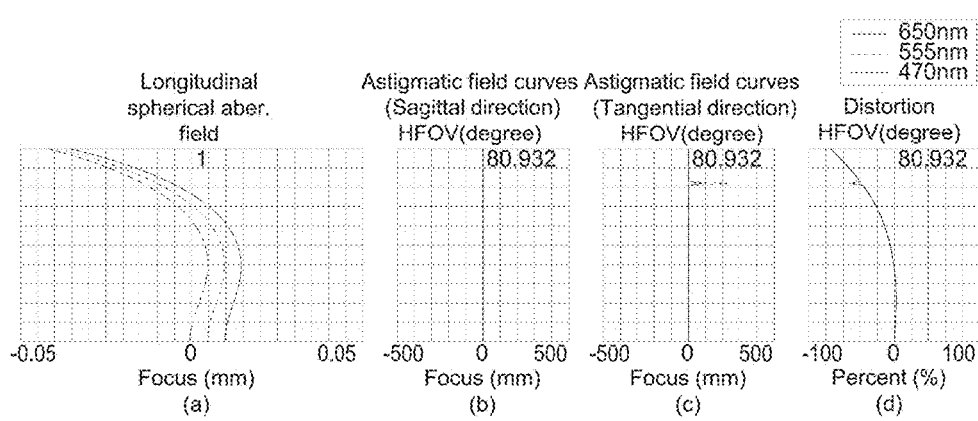
FIG. 7 depicts a chart of longitudinal spherical aberration and other kinds of optical aberrations of a first embodiment of the optical imaging lens according to the present disclosure.

Several example embodiments and associated optical data will now be provided for illustrating example embodiments of an optical imaging lens with short length, good optical characteristics, a wide view angle and/or a low f-number. Reference is now made to FIGS. 6-9. FIG. 6 illustrates an example cross-sectional view of an optical imaging lens 1 having six lens elements of the optical imaging lens according to a first example embodiment. FIG. 7 shows example charts of longitudinal spherical aberration and other kinds of optical aberrations of the optical imaging lens 1 according to an example embodiment. FIG. 8 illustrates an example table of optical data of each lens element of the optical imaging lens 1 according to an example embodiment. FIG. 9 depicts an example table of aspherical data of the optical imaging lens 1 according to an example embodiment.

As shown in FIG. 6, the optical imaging lens 1 of the present embodiment may comprise, in order from an object side A1 to an image side A2 along an optical axis, a first lens element 110, a second lens element 120, a third lens element 130, an aperture stop 100, a fourth lens element 140, a fifth lens element 150 and a sixth lens element 160. A filtering unit 170 and an image plane 180 of an image sensor are positioned at the image side A2 of the optical lens 1. Each of the first, second, third, fourth, fifth and sixth lens elements 110, 120, 130, 140, 150, 160 and the filtering unit 170 may comprise an object-side surface 111/121/131/141/151/161/171 facing toward the object side A1 and an image-side surface 112/122/132/142/152/162/172 facing toward the image side A2. The example embodiment of the filtering unit 170 illustrated may be an IR cut filter (infrared cut filter) positioned between the sixth lens element 160 and an image plane 180. The filtering unit 170 selectively absorbs light with specific wavelength from the light passing optical imaging lens 1. For example, IR light may be absorbed, and this may prohibit the IR light which is not seen by human eyes from producing an image on the image plane 180.

Please note that during the normal operation of the optical imaging lens 1, the distance between any two adjacent lens elements of the first, second, third, fourth, fifth and sixth lens elements 110, 120, 130, 140, 150, 160 is a unchanged value, i.e. the optical imaging lens 1 is a prime lens.

Example embodiments of each lens element of the optical imaging lens 1 which may be constructed by glass, plastic material or other transparent material will now be described with reference to the drawings.

An example embodiment of the first lens element 110, which may be constructed by glass material, may have negative refracting power. The object-side surface 111 may be a convex surface comprising a convex portion 1111 in a vicinity of the optical axis and a convex portion 1112 in a vicinity of a periphery of the first lens element 110. The image-side surface 112 may be a concave surface comprising a concave portion 1121 in a vicinity of the optical axis and a concave portion 1122 in a vicinity of the periphery of the first lens element 110.

An example embodiment of the second lens element 120, which may be constructed by plastic material, may have positive refracting power. The object-side surface 121 may be a concave surface comprising a concave portion 1211 in a vicinity of the optical axis and a concave portion 1212 in a vicinity of a periphery of the second lens element 120. The image-side surface 122 may be a convex surface comprising a convex portion 1221 in a vicinity of the optical axis and a convex portion 1222 in a vicinity of the periphery of the second lens element 120.

An example embodiment of the third lens element 130, which may be constructed by plastic material, may have positive refracting power. The object-side surface 131 may be a concave surface comprising a concave portion 1311 in a vicinity of the optical axis and a concave portion 1312 in a vicinity of a periphery of the third lens element 130. The image-side surface 132 may be a convex surface comprising a convex portion 1321 in a vicinity of the optical axis and a convex portion 1322 in a vicinity of the periphery of the third lens element 130.

An example embodiment of the fourth lens element 140, which may be constructed by plastic material, may have positive refracting power. The object-side surface 141 may be a convex surface comprising a convex portion 1411 in a vicinity of the optical axis and a convex portion 1412 in a vicinity of a periphery of the fourth lens element 140. The image-side surface 142 may be a convex surface comprising a convex portion 1421 in a vicinity of the optical axis and a convex portion 1422 in a vicinity of the periphery of the fourth lens element 140.

An example embodiment of the fifth lens element 150, which may be constructed by plastic material, may have negative refracting power. The object-side surface 151 may be a concave surface comprising a concave portion 1511 in a vicinity of the optical axis and a concave portion 1512 in a vicinity of a periphery of the fifth lens element 150. The image-side surface 152 may comprise a convex portion 1521 in a vicinity of the optical axis and a concave portion 1522 in a vicinity of the periphery of the fifth lens element 150.

An example embodiment of the sixth lens element 160, which may be constructed by plastic material, may have positive power. The object-side surface 161 may be a convex surface comprising a convex portion 1611 in a vicinity of the optical axis and a convex portion 1612 in a vicinity of a periphery of the fifth lens element 160. The image-side surface 162 may comprise a concave portion 1621 in a vicinity of the optical axis and a convex portion 1622 in a vicinity of the periphery of the fifth lens element 160.

In example embodiments, air gaps may exist between each pair of adjacent lens elements, as well as between the sixth lens element 160 and the filtering unit 170, and the filtering unit 170 and the image plane 180 of the image sensor. For example, FIG. 1 illustrates the air gap d1 existing between the first lens element 110 and the second lens element 120, the air gap d2 existing between the second lens element 120 and the third lens element 130, the air gap d3 existing between the third lens element 130 and the fourth lens element 140, the air gap d4 existing between the fourth lens element 140 and the fifth lens element 150, the air gap d5 existing between the fifth lens element 150 and the sixth lens element 160, the air gap d6 existing between the sixth lens element 160 and the filtering unit 170, and the air gap d7 existing between the filtering unit 170 and the image plane 180 of the image sensor. The air gap d1 is denoted by G12, the air gap d2 is denoted by G23, the air gap d3 is denoted by G34, the air gap d4 is denoted by G45, the air gap d5 is denoted by G56, and the sum of d1, d2, d3, d4 and d5 equals to AAG. Please note, in other embodiments, any of the aforementioned air gaps may or may not exist. For example, the profiles of opposite surfaces of any two adjacent lens elements may correspond to each other, and in such situations, the air gap may not exist.

FIG. 8 depicts the optical characteristics of each lens elements in the optical imaging lens 1 of the present embodiment, and please refer to FIG. 46 for the values of BFL, EFL, TTL, ALT, AAG, SL, SL/TTL, TTL/(T3+G34), T3/T5, AAG/T2, EFL/T1, ALT/EFL, (G12+G23)/T5, EFL/(G34+G56), ALT/(T1+T4), T6/(G34+G45), ALT/(T3+T5), (G12+G45)/T4, T3/(G23+G34), (T2+T5)/EFL, ALT/(T4+T5+T6) and T2/T1 corresponding to the present embodiment. The distance from the object-side surface 111 of the first lens element 110 to the image plane 180 along the optical axis may be about 7.929 mm, the effective focal length (EFL) may be about 0.998 mm, half field of view angle (HFOV) may be about 80.932 degrees, and f-number (Fno) may be about 2.17.

The aspherical surfaces, including the object-side surface 121 and the image-side surface 122 of the second lens element 120, the object-side surface 131 and the image-side surface 132 of the third lens element 130, the object-side surface 141 and the image-side surface 142 of the fourth lens element 140, the object-side surface 151 and the image-side surface 152 of the fifth lens element 150, the object-side surface 161 and the image-side surface 162 of the sixth lens element 160, are all defined by the following aspherical formula:

$$Z(Y) = \frac{Y^2}{R} \bigg/ \left(1 + \sqrt{1 - (1+K)\frac{Y^2}{R^2}}\right) + \sum_{i=1}^{n} a_{2i} \times Y^{2i}$$

wherein, Y represents the perpendicular distance between the point of the aspherical surface and the optical axis; Z represents the depth of the aspherical surface (the perpendicular distance between the point of the aspherical surface at a distance Y from the optical axis and the tangent plane of the vertex on the optical axis of the aspherical surface); R represents the radius of curvature of the surface of the lens element; K represents a conic constant; and $a_{2i}$ represents an aspherical coefficient of $2i^{th}$ level. The values of each aspherical parameter are shown in FIG. 9.

Please refer to FIG. 7(a), longitudinal spherical aberration of the optical imaging lens in the present embodiment is shown in coordinates in which the horizontal axis represents focus and the vertical axis represents field of view, and FIG. 7(b), astigmatism aberration of the optical imaging lens in the present embodiment in the sagittal direction is shown in coordinates in which the horizontal axis represents focus and the vertical axis represents image height, and FIG. 7(c), astigmatism aberration in the tangential direction of the optical imaging lens in the present embodiment is shown in coordinates in which the horizontal axis represents focus and the vertical axis represents image height, and FIG. 7(d), distortion aberration of the optical imaging lens in the present embodiment is shown in coordinates in which the horizontal axis represents percentage and the vertical axis represents image height. The curves of different wavelengths (470 nm, 555 nm, 650 nm) are closed to each other. This represents that off-axis light with respect to these wavelengths is focused around an image point. From the vertical deviation of each curve shown therein, the offset of the off-axis light relative to the image point may be within about ±0.05 mm. Therefore, the present embodiment improves the longitudinal spherical aberration with respect to different wavelengths. For astigmatism aberration in the sagittal direction, the focus variation with respect to the three wavelengths in the whole field may fall within about ±0 mm, for astigmatism aberration in the tangential direction, the focus variation with respect to the three wavelengths in the whole field may fall within about ±300 mm, and the variation of the distortion aberration may be within about ±80%.

According to the value of the aberrations, it is shown that the optical imaging lens 1 of the present embodiment, with the length as short as about 7.929 mm and HFOV as great as about 80.932 degrees, may be capable of providing good imaging quality as well as good optical characteristics. Therefore, compared with conventional lens systems, the optical imaging lens 1 may be capable of providing excellent imaging quality and wider view angle for smaller sized mobile devices.

Figure 10:
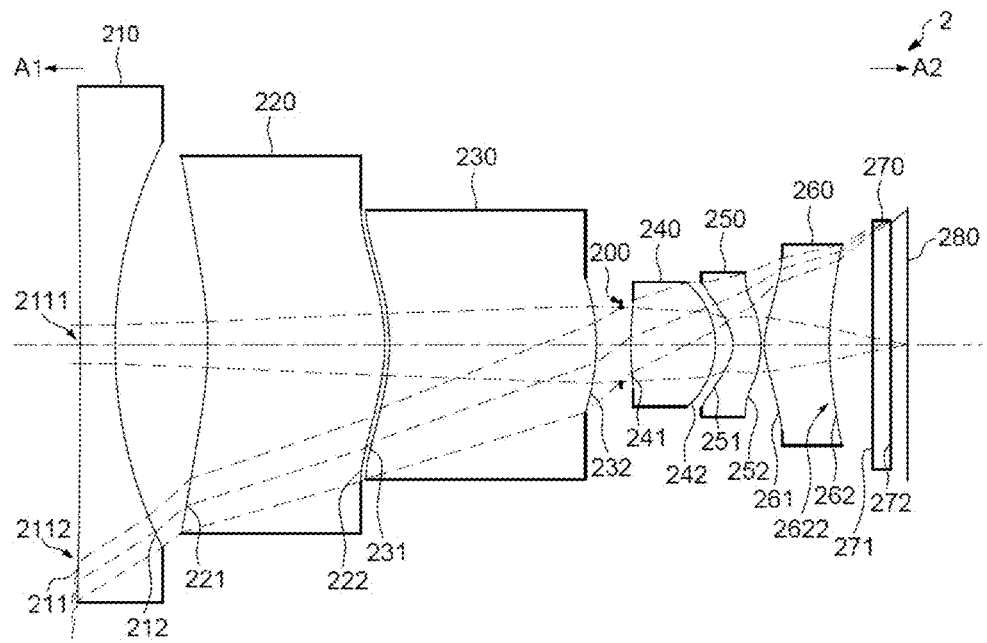
FIG. 10 depicts a cross-sectional view of a second embodiment of an optical imaging lens having six lens elements according to the present disclosure.
Figure 11:
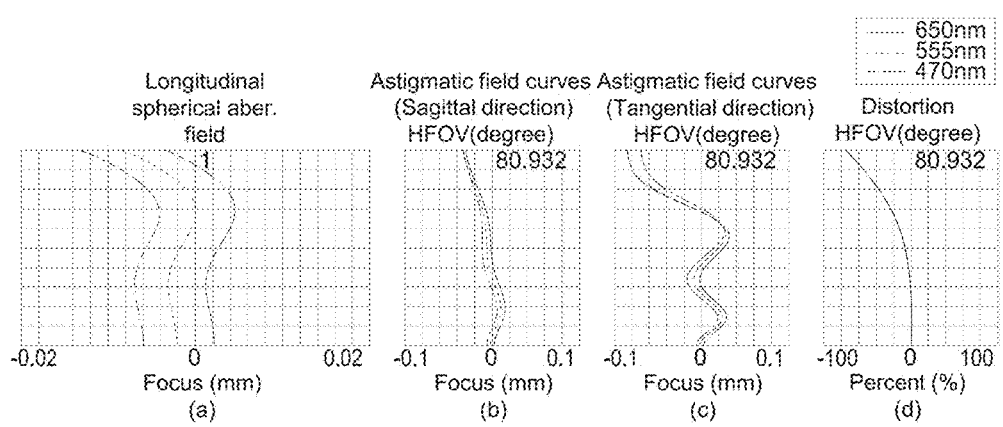
FIG. 11 depicts a chart of longitudinal spherical aberration and other kinds of optical aberrations of a second embodiment of the optical imaging lens according to the present disclosure.

Reference is now made to FIGS. 10-13. FIG. 10 illustrates an example cross-sectional view of an optical imaging lens 2 having six lens elements of the optical imaging lens 2 according to a second example embodiment. FIG. 11 shows example charts of longitudinal spherical aberration and other kinds of optical aberrations of the optical imaging lens 2 according to the second example embodiment. FIG. 12 shows an example table of optical data of each lens element of the optical imaging lens 2 according to the second example embodiment. FIG. 13 shows an example table of aspherical data of the optical imaging lens 2 according to the second example embodiment. The reference numbers labeled in the present embodiment are similar to those in the first embodiment for the similar elements, but here the reference numbers are initialed with 2, for example, reference number 231 for labeling the object-side surface of the third lens element 230, reference number 232 for labeling the image-side surface of the third lens element 230, etc.

As shown in FIG. 10, the optical imaging lens 2 of the present embodiment, in an order from an object side A1 to an image side A2 along an optical axis, may comprise a first lens element 210, a second lens element 220, a third lens element 230, an aperture stop 200, a fourth lens element 240, a fifth lens element 250 and a sixth lens element 260.

The differences between the second embodiment and the first embodiment may include the radius of curvature, thickness of each lens element, the distance of each air gap, aspherical data, related optical parameters, such as back focal length, and the configuration of the concave/convex shape of the object-side surface 211 and the image-side surface 262; but the configuration of the concave/convex shape of surfaces, comprising the object-side surfaces 221, 231, 241, 251, 261 facing to the object side A1 and the image-side surfaces 212, 222, 232, 242, 252 facing to the image side A2, are similar to those in the first embodiment. Here and in the embodiments hereinafter, for clearly showing the drawings of the present embodiment, only the surface shapes which are different from that in the first embodiment are labeled. Specifically, the differences of configuration of surface shape are: the object-side surface 211 may be a concave surface comprising a concave portion 2111 in a vicinity of the optical axis and a concave portion 2112 in a vicinity of a periphery of the first lens element 210, and the image-side surface 262 may comprise a concave portion 2622 in a vicinity of a periphery of the sixth lens element 260. Please refer to FIG. 12 for the optical characteristics of each lens elements in the optical imaging lens 2 the present embodiment, and please refer to FIG. 46 for the values of BFL, EFL, TTL, ALT, AAG, SL, SL/TTL, TTL/(T3+G34), T3/T5, AAG/T2, EFL/T1, ALT/EFL, (G12+G23)/T5, EFL/(G34+G56), ALT/(T1+T4), T6/(G34+G45), ALT/(T3+T5), (G12+G45)/T4, T3/(G23+G34), (T2+T5)/EFL, ALT/(T4+T5+T6) and T2/T1 of the present embodiment.

As the longitudinal spherical aberration shown in FIG. 11(a), the offset of the off-axis light relative to the image point may be within about ±0.02 mm. As the astigmatism aberration in the sagittal direction shown in FIG. 11(b), the focus variation with respect to the three wavelengths in the whole field may fall within about ±0.1 mm. As the astigmatism aberration in the tangential direction shown in FIG. 11(c), the focus variation with respect to the three wavelengths in the whole field may fall within about ±0.1 mm. As shown in FIG. 11(d), the variation of the distortion aberration may be within about ±80%.

Compared with the first embodiment, the longitudinal spherical aberration and astigmatism aberration in the tangential direction of the optical imaging lens 2 are less. According to the value of the aberrations, it is shown that the optical imaging lens 2 of the present embodiment, with the length as short as about 9.581 mm and HFOV as large as about 80.932 degrees, may be capable of providing good imaging quality as well as good optical characteristics.

Figure 14:
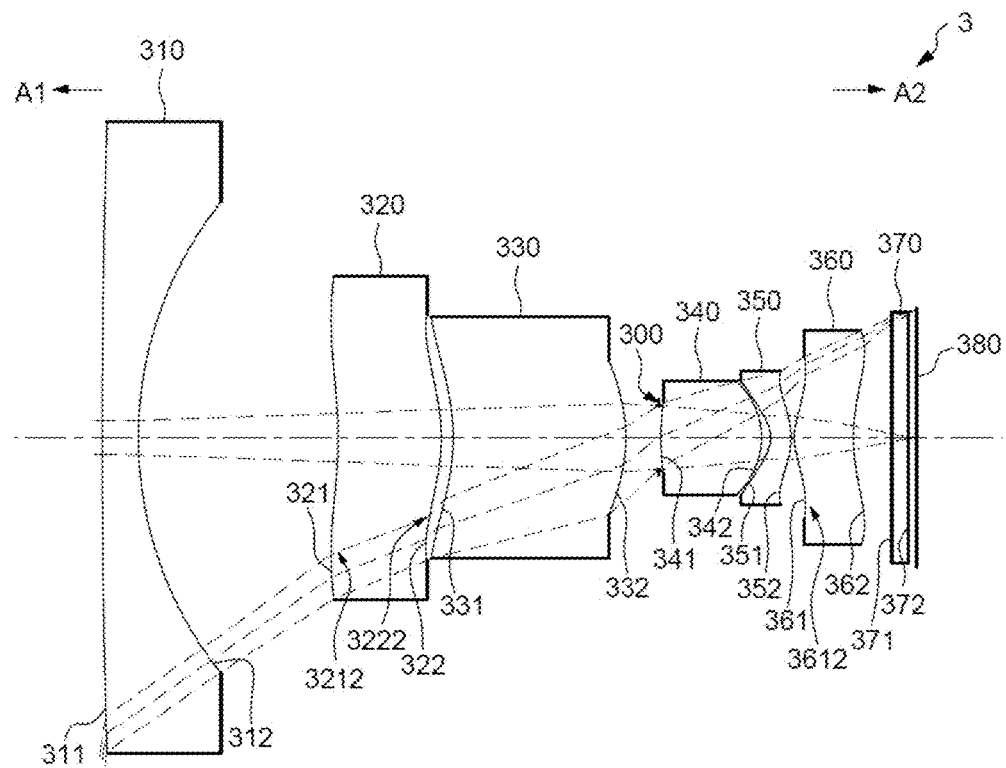
FIG. 14 depicts a cross-sectional view of a third embodiment of an optical imaging lens having six lens elements according to the present disclosure.
Figure 15:
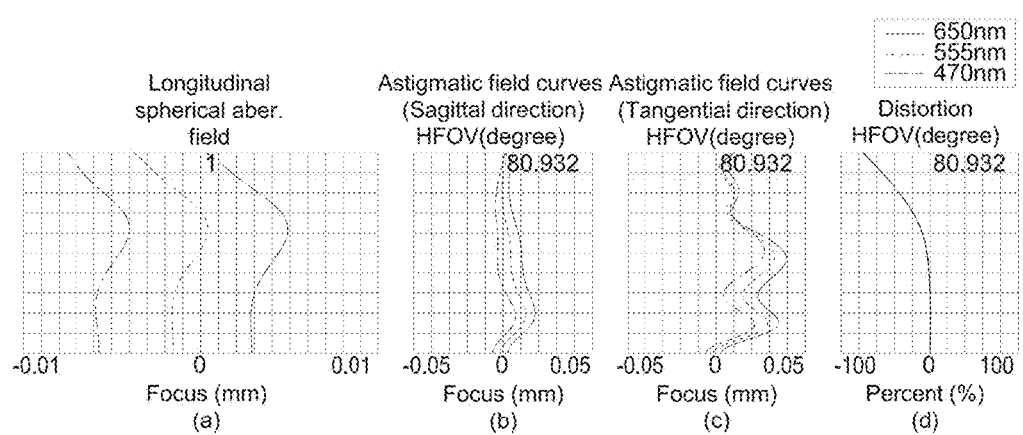
FIG. 15 depicts a chart of longitudinal spherical aberration and other kinds of optical aberrations of a third embodiment of the optical imaging lens according the present disclosure.

Reference is now made to FIGS. 14-17. FIG. 14 illustrates an example cross-sectional view of an optical imaging lens 3 having six lens elements of the optical imaging lens 3 according to a third example embodiment. FIG. 15 shows example charts of longitudinal spherical aberration and other kinds of optical aberrations of the optical imaging lens 3 according to the third example embodiment. FIG. 16 shows an example table of optical data of each lens element of the optical imaging lens 3 according to the third example embodiment. FIG. 17 shows an example table of aspherical data of the optical imaging lens 3 according to the third example embodiment. The reference numbers labeled in the present embodiment are similar to those in the first embodiment for the similar elements, but here the reference numbers are initialed with 3, for example, reference number 331 for labeling the object-side surface of the third lens element 330, reference number 332 for labeling the image-side surface of the third lens element 330, etc.

As shown in FIG. 14, the optical imaging lens 3 of the present embodiment, in an order from an object side A1 to an image side A2 along an optical axis, may comprise a first lens element 310, a second lens element 320, a third lens element 330, an aperture stop 300, a fourth lens element 340, a fifth lens element 350 and a sixth lens element 360.

The differences between the third embodiment and the first embodiment may include the radius of curvature and thickness of each lens element, the distance of each air gap, aspherical data, related optical parameters, such as back focal length, and the configuration of the concave/convex shape of the object-side surfaces 321, 361 and the image-side surface 322; but the configuration of the concave/convex shape of surfaces, comprising the object-side surfaces 311, 331, 341, 351 facing to the object side A1 and the image-side surfaces 312, 332, 342, 352, 362 facing to the image side A2, are similar to those in the first embodiment. Specifically, the differences of configuration of surface shape are: the object-side surface 321 may comprise a convex portion 3212 in a vicinity of a periphery of the second lens element 320, the image-side surface 322 may comprise a concave portion 3222 in a vicinity of the periphery of the second lens element 320, and the object-side surface 361 may comprise a concave portion 3612 in a vicinity of a periphery of the sixth lens element 360. Please refer to FIG. 16 for the optical characteristics of each lens elements in the optical imaging lens 3 of the present embodiment, and please refer to FIG. 46 for the values of BFL, EFL, TTL, ALT, AAG, SL, SL/TTL, TTL/(T3+G34), T3/T5, AAG/T2, EFL/T1, ALT/EFL, (G12+G23)/T5, EFL/(G34+G56), ALT/(T1+T4), T6/(G34+G45), ALT/(T3+T5), (G12+G45)/T4, T3/(G23+G34), (T2+T5)/EFL, ALT/(T4+T5+T6) and T2/T1 of the present embodiment.

As the longitudinal spherical aberration shown in FIG. 15(a), the offset of the off-axis light relative to the image point may be within about ±0.01 mm. As the astigmatism aberration in the sagittal direction shown in FIG. 15(b), the focus variation with respect to the three wavelengths in the whole field may fall within about ±0.05 mm. As the astigmatism aberration in the tangential direction shown in FIG. 15(c), the focus variation with respect to the three wavelengths in the whole field may fall within about ±0.05 mm. As shown in FIG. 15(d), the variation of the distortion aberration may be within about ±80%.

Compared with the first embodiment, the longitudinal spherical aberration and the astigmatism aberration in the tangential direction of the optical imaging lens 3 are less. According to the value of the aberrations, it is shown that the optical imaging lens 3 of the present embodiment, with the length as short as about 10.543 mm and HFOV as large as about 80.932 degrees, may be capable of providing good imaging quality as well as good optical characteristics. Further, the optical imaging lens 3 of the present embodiment shows a good yield in the manufacture process.

Figure 18:
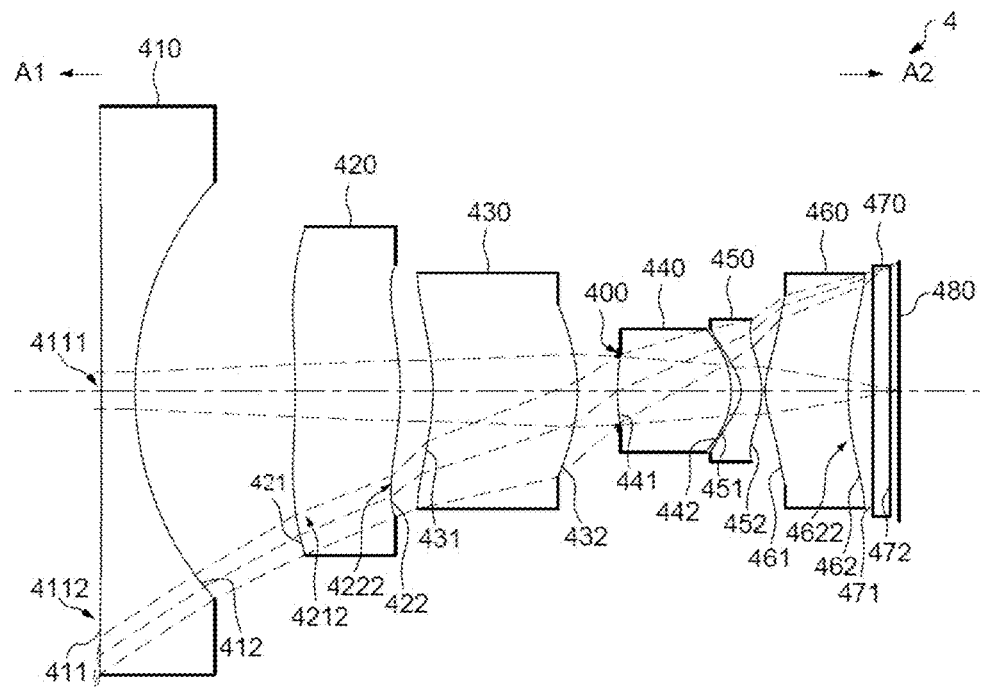
FIG. 18 depicts a cross-sectional view of a fourth embodiment of an optical imaging lens having six lens elements according to the present disclosure.
Figure 19:
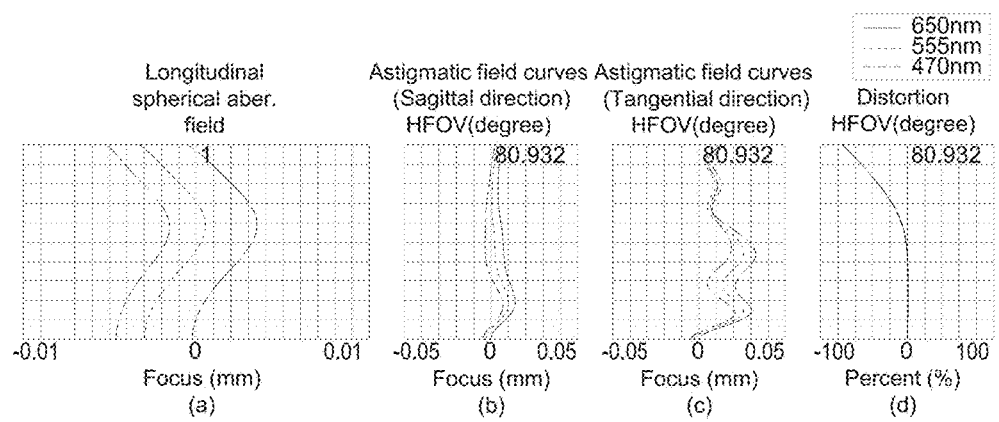
FIG. 19 depicts a chart of longitudinal spherical aberration and other kinds of optical aberrations of a fourth embodiment of the optical imaging lens according the present disclosure.

Reference is now made to FIGS. 18-21. FIG. 18 illustrates an example cross-sectional view of an optical imaging lens 4 having six lens elements of the optical imaging lens according to a fourth example embodiment. FIG. 19 shows example charts of longitudinal spherical aberration and other kinds of optical aberrations of the optical imaging lens 4 according to the fourth embodiment. FIG. 20 shows an example table of optical data of each lens element of the optical imaging lens 4 according to the fourth example embodiment. FIG. 21 shows an example table of aspherical data of the optical imaging lens 4 according to the fourth example embodiment. The reference numbers labeled in the present embodiment are similar to those in the first embodiment for the similar elements, but here the reference numbers are initialed with 4, for example, reference number 431 for labeling the object-side surface of the third lens element 430, reference number 432 for labeling the image-side surface of the third lens element 430, etc.

As shown in FIG. 18, the optical imaging lens 4 of the present embodiment, in an order from an object side A1 to an image side A2 along an optical axis, may comprise a first lens element 410, a second lens element 420, a third lens element 430, an aperture stop 400, a fourth lens element 440, a fifth lens element 450 and the sixth lens element 460.

The differences between the fourth embodiment and the first embodiment may include the radius of curvature and thickness of each lens element, the distance of each air gap, aspherical data, related optical parameters, such as back focal length, and the configuration of the concave/convex shape of the object-side surfaces 411, 421 and the image-side surface 422, 462; but the configuration of the concave/convex shape of surfaces, comprising the object-side surfaces 431, 441, 451, 461 facing to the object side A1 and the image-side surfaces 412, 432, 442, 452 facing to the image side A2, are similar to those in the first embodiment. Specifically, the differences of configuration of surface shape are: the object-side surface 411 may be a concave surface comprising a concave portion 4111 in a vicinity of the optical axis and a concave portion 4112 in a vicinity of a periphery of the first lens element 410, the object-side surface 421 may comprise a convex portion 4212 in a vicinity of the periphery of the second lens element 420, the image-side surface 422 may comprise a concave portion 4222 in a vicinity of a periphery of the second lens element 420, and the image-side surface 462 may comprise a concave portion 4622 in a vicinity of a periphery of the sixth lens element 460. Please refer to FIG. 20 for the optical characteristics of each lens elements in the optical imaging lens 4 of the present embodiment, please refer to FIG. 46 for the values of BFL, EFL, TTL, ALT, AAG, SL, SL/TTL, TTL/(T3+G34), T3/T5, AAG/T2, EFL/T1, ALT/EFL, (G12+G23)/T5, EFL/(G34+G56), ALT/(T1+T4), T6/(G34+G45), ALT/(T3+T5), (G12+G45)/T4, T3/(G23+G34), (T2+T5)/EFL, ALT/(T4+T5+T6) and T2/T1 of the present embodiment.

As the longitudinal spherical aberration shown in FIG. 19(a), the offset of the off-axis light relative to the image point may be within about ±0.01 mm. As the astigmatism aberration in the sagittal direction shown in FIG. 19(b), the focus variation with respect to the three wavelengths in the whole field may fall within about ±0.05 mm. As the astigmatism aberration in the tangential direction shown in FIG. 19(c), the focus variation with respect to the three wavelengths in the whole field may fall within about ±0.05 mm. As shown in FIG. 19(d), the variation of the distortion aberration may be within about ±80%.

Compared with the first embodiment, the longitudinal spherical aberration and the astigmatism aberration in the tangential direction of the optical imaging lens 4 are less. According to the value of the aberrations, it is shown that the optical imaging lens 4 of the present embodiment, with the length as short as about 9.742 mm and HFOV as large as about 80.932 degrees, may be capable of providing good imaging quality as well as good optical characteristics.

Figure 22:
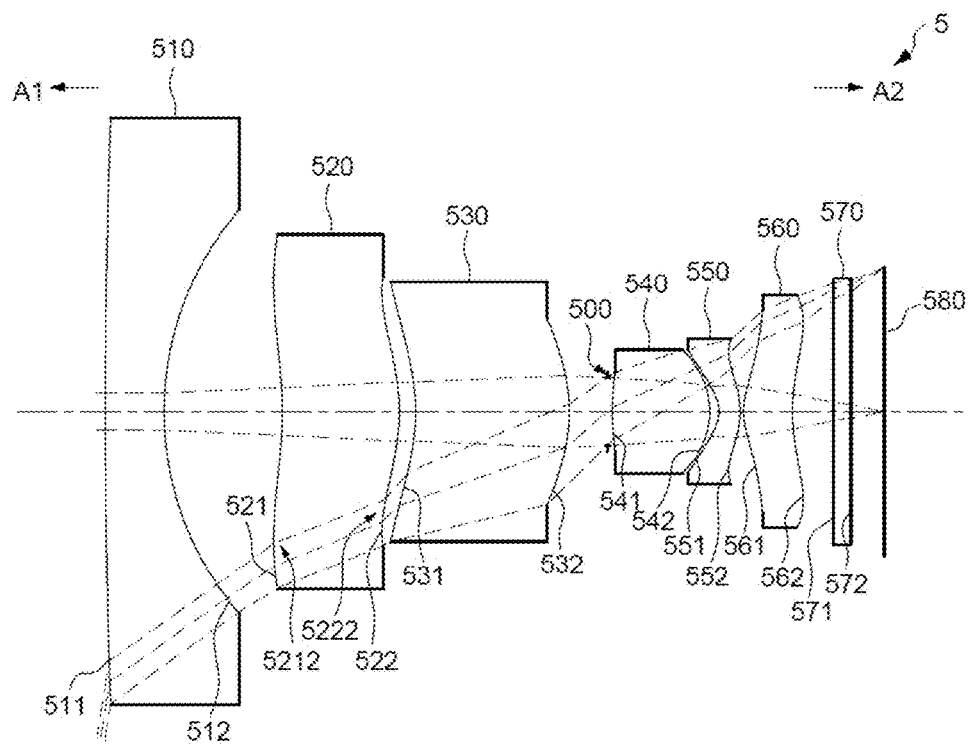
FIG. 22 depicts a cross-sectional view of a fifth embodiment of an optical imaging lens having six lens elements according to the present disclosure.
Figure 23:
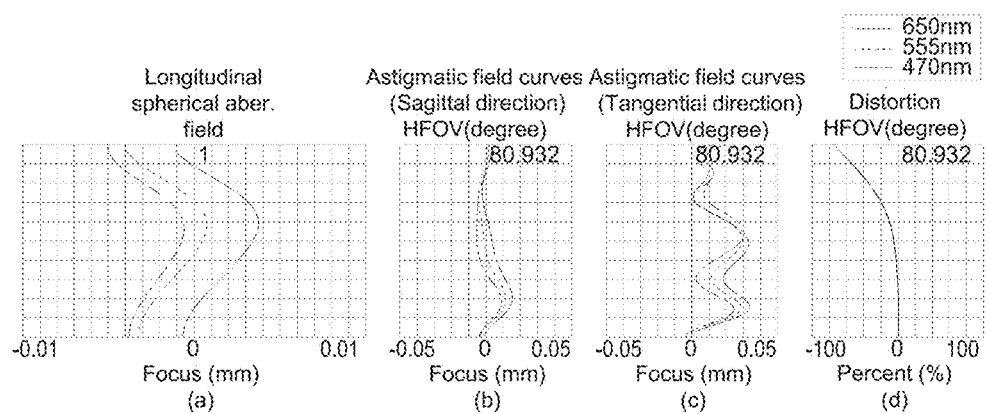
FIG. 23 depicts a chart of longitudinal spherical aberration and other kinds of optical aberrations of a fifth embodiment of the optical imaging lens according the present disclosure.

Reference is now made to FIGS. 22-25. FIG. 22 illustrates an example cross-sectional view of an optical imaging lens 5 having six lens elements of the optical imaging lens according to a fifth example embodiment. FIG. 23 shows example charts of longitudinal spherical aberration and other kinds of optical aberrations of the optical imaging lens 5 according to the fifth embodiment. FIG. 24 shows an example table of optical data of each lens element of the optical imaging lens 5 according to the fifth example embodiment. FIG. 25 shows an example table of aspherical data of the optical imaging lens 5 according to the fifth example embodiment. The reference numbers labeled in the present embodiment are similar to those in the first embodiment for the similar elements, but here the reference numbers are initialed with 5, for example, reference number 531 for labeling the object-side surface of the third lens element 530, reference number 532 for labeling the image-side surface of the third lens element 530, etc.

As shown in FIG. 22, the optical imaging lens 5 of the present embodiment, in an order from an object side A1 to an image side A2 along an optical axis, may comprise a first lens element 510, a second lens element 520, a third lens element 530, an aperture stop 500, a fourth lens element 540, a fifth lens element 550 and the sixth lens element 560.

The differences between the fifth embodiment and the first embodiment may include the radius of curvature and thickness of each lens element, the distance of each air gap, aspherical data, related optical parameters, such as back focal length, and the configuration of the concave/convex shape of the object-side surface 521 and the image-side surface 522; but the configuration of the concave/convex shape of surfaces, comprising the object-side surfaces 511, 531, 541, 551, 561 facing to the object side A1 and the image-side surfaces 512, 532, 542, 552, 562 facing to the image side A2, are similar to those in the first embodiment. Specifically, the differences of configuration of surface shape are: the object-side surface 521 may comprise a convex portion 5212 in a vicinity of a periphery of the second lens element 520, and the image-side surface 522 may comprise a concave portion 5222 in a vicinity of the periphery of the second lens element 520. Please refer to FIG. 24 for the optical characteristics of each lens elements in the optical imaging lens 5 of the present embodiment, please refer to FIG. 46 for the values of BFL, EFL, TTL, ALT, AAG, SL, SL/TTL, TTL/(T3+G34), T3/T5, AAG/T2, EFL/T1, ALT/EFL, (G12+G23)/T5, EFL/(G34+G56), ALT/(T1+T4), T6/(G34+G45), ALT/(T3+T5), (G12+G45)/T4, T3/(G23+G34), (T2+T5)/EFL, ALT/(T4+T5+T6) and T2/T1 of the present embodiment.

As the longitudinal spherical aberration shown in FIG. 23(a), the offset of the off-axis light relative to the image point may be within about ±0.01 mm. As the astigmatism aberration in the sagittal direction shown in FIG. 23(b), the focus variation with respect to the three wavelengths in the whole field may fall within about ±0.05 mm. As the astigmatism aberration in the tangential direction shown in FIG. 23(c), the focus variation with respect to the three wavelengths in the whole field may fall within about ±0.05 mm. As shown in FIG. 23(d), the variation of the distortion aberration may be within about ±80%.

Compared with the first embodiment, the longitudinal spherical aberration and the astigmatism aberration in the tangential direction of the optical imaging lens 5 are less. According to the value of the aberrations, it is shown that the optical imaging lens 5 of the present embodiment, with the length as short as about 9.643 mm and HFOV as large as about 80.932 degrees, may be capable of providing good imaging quality as well as good optical characteristics. Further, the optical imaging lens 5 of the present embodiment shows a good yield in the manufacture process.

Figure 26:
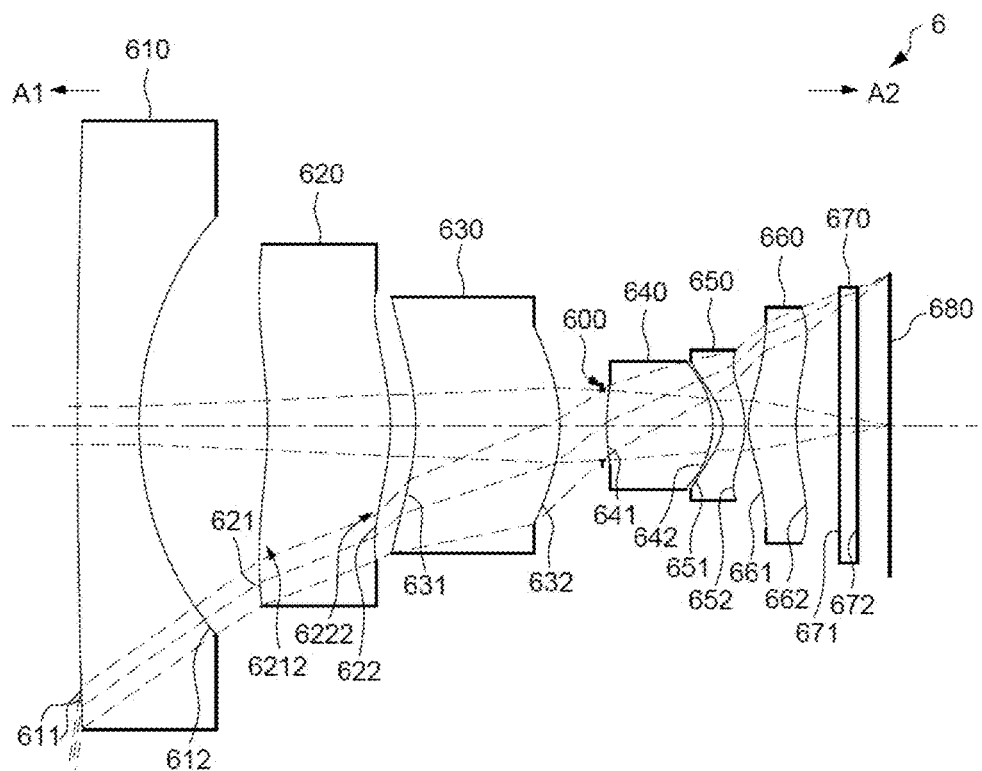
FIG. 26 depicts a cross-sectional view of a sixth embodiment of an optical imaging lens having six lens elements according to the present disclosure.
Figure 27:
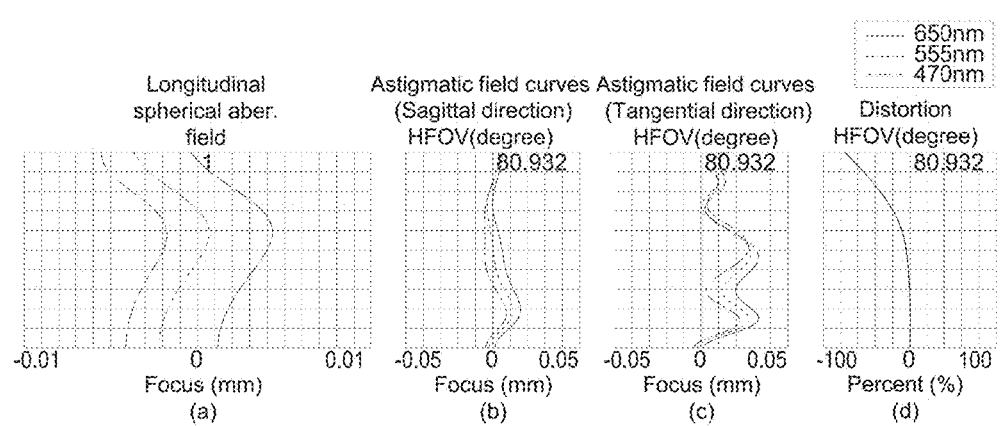
FIG. 27 depicts a chart of longitudinal spherical aberration and other kinds of optical aberrations of a sixth embodiment of the optical imaging lens according the present disclosure.

Reference is now made to FIGS. 26-29. FIG. 26 illustrates an example cross-sectional view of an optical imaging lens 6 having six lens elements of the optical imaging lens according to a sixth example embodiment. FIG. 27 shows example charts of longitudinal spherical aberration and other kinds of optical aberrations of the optical imaging lens 6 according to the sixth embodiment. FIG. 28 shows an example table of optical data of each lens element of the optical imaging lens 6 according to the sixth example embodiment. FIG. 29 shows an example table of aspherical data of the optical imaging lens 6 according to the sixth example embodiment. The reference numbers labeled in the present embodiment are similar to those in the first embodiment for the similar elements, but here the reference numbers are initialed with 6, for example, reference number 631 for labeling the object-side surface of the third lens element 630, reference number 632 for labeling the image-side surface of the third lens element 630, etc.

As shown in FIG. 26, the optical imaging lens 6 of the present embodiment, in an order from an object side A1 to an image side A2 along an optical axis, may comprise a first lens element 610, a second lens element 620, a third lens element 630, an aperture stop 600, a fourth lens element 640, a fifth lens element 650 and the sixth lens element 660.

The differences between the sixth embodiment and the first embodiment may include the radius of curvature and thickness of each lens element, the distance of each air gap, aspherical data, related optical parameters, such as back focal length, and the configuration of the concave/convex shape of the object-side surface 621 and the image-side surface 622; but the configuration of the concave/convex shape of surfaces, comprising the object-side surfaces 611, 631, 641, 651, 661 facing to the object side A1 and the image-side surfaces 612, 632, 642, 652, 662 facing to the image side A2, are similar to those in the first embodiment. Specifically, the differences of configuration of surface shape are: the object-side surface 621 may comprise a convex portion 6212 in a vicinity of a periphery of the second lens element 620, and the image-side surface 622 may comprise a concave portion 6222 in a vicinity of the periphery of the second lens element 620. Please refer to FIG. 28 for the optical characteristics of each lens elements in the optical imaging lens 6 of the present embodiment, please refer to FIG. 46 for the values of BFL, EFL, TTL, ALT, AAG, SL, SL/TTL, TTL/(T3+G34), T3/T5, AAG/T2, EFL/T1, ALT/EFL, (G12+G23)/T5, EFL/(G34+G56), ALT/(T1+T4), T6/(G34+G45), ALT/(T3+T5), (G12+G45)/T4, T3/(G23+G34), (T2+T5)/EFL, ALT/(T4+T5+T6) and T2/T1 of the present embodiment.

As the longitudinal spherical aberration shown in FIG. 27(a), the offset of the off-axis light relative to the image point may be within about ±0.01 mm. As the astigmatism aberration in the sagittal direction shown in FIG. 27(b), the focus variation with respect to the three wavelengths in the whole field may fall within about ±0.05 mm. As the astigmatism aberration in the tangential direction shown in FIG. 27(c), the focus variation with respect to the three wavelengths in the whole field may fall within about ±0.05 mm. As shown in FIG. 27(d), the variation of the distortion aberration may be within about ±80%.

Compared with the first embodiment, the longitudinal spherical aberration and astigmatism aberrations both in the sagittal and tangential directions are less. According to the value of the aberrations, it is shown that the optical imaging lens 6 of the present embodiment, with the length as short as about 9.464 mm and HFOV as large as about 80.932 degrees, may be capable of providing good imaging quality as well as good optical characteristics.

Figure 30:
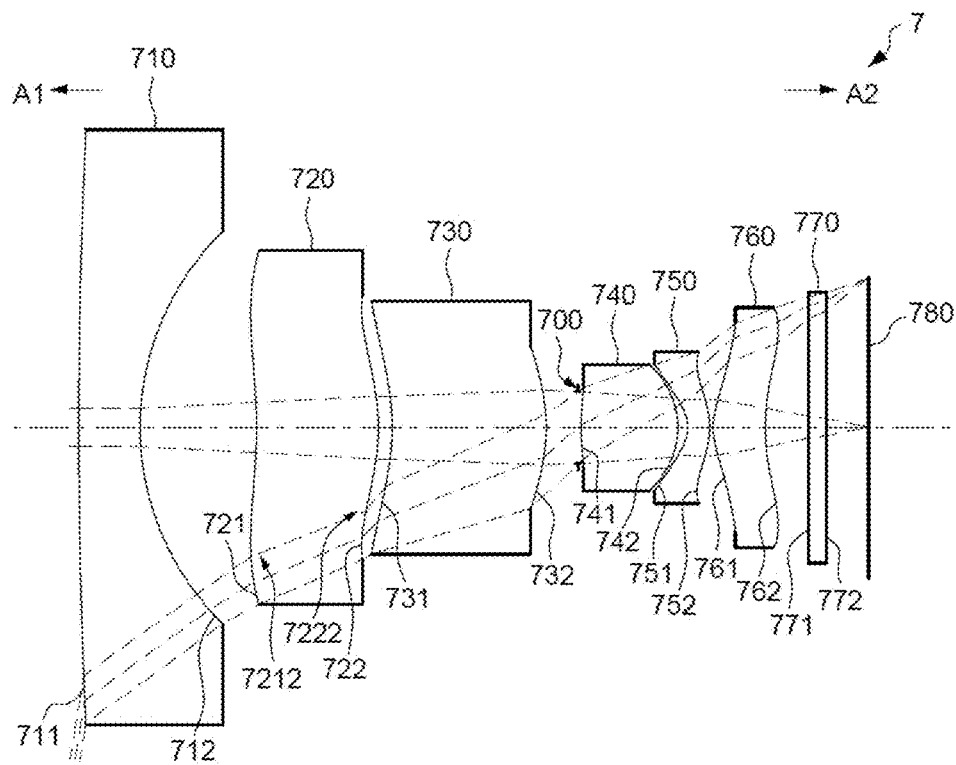
FIG. 30 depicts a cross-sectional view of a seventh embodiment of an optical imaging lens having six lens elements according to the present disclosure.
Figure 31:
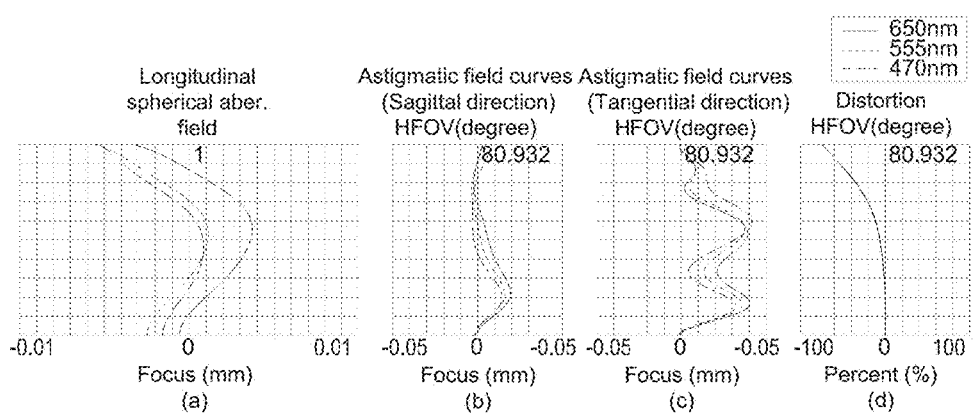
FIG. 31 depicts a chart of longitudinal spherical aberration and other kinds of optical aberrations of a seventh embodiment of the optical imaging lens according to the present disclosure.

Reference is now made to FIGS. 30-33. FIG. 30 illustrates an example cross-sectional view of an optical imaging lens 7 having six lens elements of the optical imaging lens according to a seventh example embodiment. FIG. 31 shows example charts of longitudinal spherical aberration and other kinds of optical aberrations of the optical imaging lens 7 according to the seventh embodiment. FIG. 32 shows an example table of optical data of each lens element of the optical imaging lens 7 according to the seventh example embodiment. FIG. 33 shows an example table of aspherical data of the optical imaging lens 7 according to the seventh example embodiment. The reference numbers labeled in the present embodiment are similar to those in the first embodiment for the similar elements, but here the reference numbers are initialed with 7, for example, reference number 731 for labeling the object-side surface of the third lens element 730, reference number 732 for labeling the image-side surface of the third lens element 730, etc.

As shown in FIG. 30, the optical imaging lens 7 of the present embodiment, in an order from an object side A1 to an image side A2 along an optical axis, may comprise a first lens element 710, a second lens element 720, a third lens element 730, an aperture stop 700, a fourth lens element 740, a fifth lens element 750 and a sixth lens element 760.

The differences between the seventh embodiment and the first embodiment may include the radius of curvature and thickness of each lens element, the distance of each air gap, aspherical data, related optical parameters, such as back focal length, and the configuration of the concave/convex shape of the object-side surfaces 721 and the image-side surface 722; but the configuration of the concave/convex shape of surfaces, comprising the object-side surfaces 711, 731, 741, 751, 761 facing to the object side A1 and the image-side surfaces 712, 732, 742, 752, 762 facing to the image side A2, are similar to those in the first embodiment. Specifically, the differences of configuration of surface shape are: the object-side surface 721 may comprise a convex portion 7212 in a vicinity of a periphery of the second lens element 720, and the image-side surface 722 may comprise a concave portion 7222 in a vicinity of the periphery of the second lens element 720. Please refer to FIG. 32 for the optical characteristics of each lens elements in the optical imaging lens 7 of the present embodiment, please refer to FIG. 46 for the values of BFL, EFL, TTL, ALT, AAG, SL, SL/TTL, TTL/(T3+G34), T3/T5, AAG/T2, EFL/T1, ALT/EFL, (G12+G23)/T5, EFL/(G34+G56), ALT/(T1+T4), T6/(G34+G45), ALT/(T3+T5), (G12+G45)/T4, T3/(G23+G34), (T2+T5)/EFL, ALT/(T4+T5+T6) and T2/T1 of the present embodiment.

As the longitudinal spherical aberration shown in FIG. 31(a), the offset of the off-axis light relative to the image point may be within about ±0.01 mm. As the astigmatism aberration in the sagittal direction shown in FIG. 31(b), the focus variation with respect to the three wavelengths in the whole field may fall within about ±0.05 mm. As the astigmatism aberration in the tangential direction shown in FIG. 31(c), the focus variation with respect to the three wavelengths in the whole field may fall within about ±0.05 mm. As shown in FIG. 31(d), the variation of the distortion aberration may be within about ±80%.

Compared with the first embodiment, the longitudinal spherical aberration and the astigmatism aberration in the tangential direction of the optical imaging lens 7 are less. According to the value of the aberrations, it is shown that the optical imaging lens 7 of the present embodiment, with the length as short as about 9.179 mm and HFOV as large as about 80.932 degrees, may be capable of providing good imaging quality as well as good optical characteristics.

Figure 34:
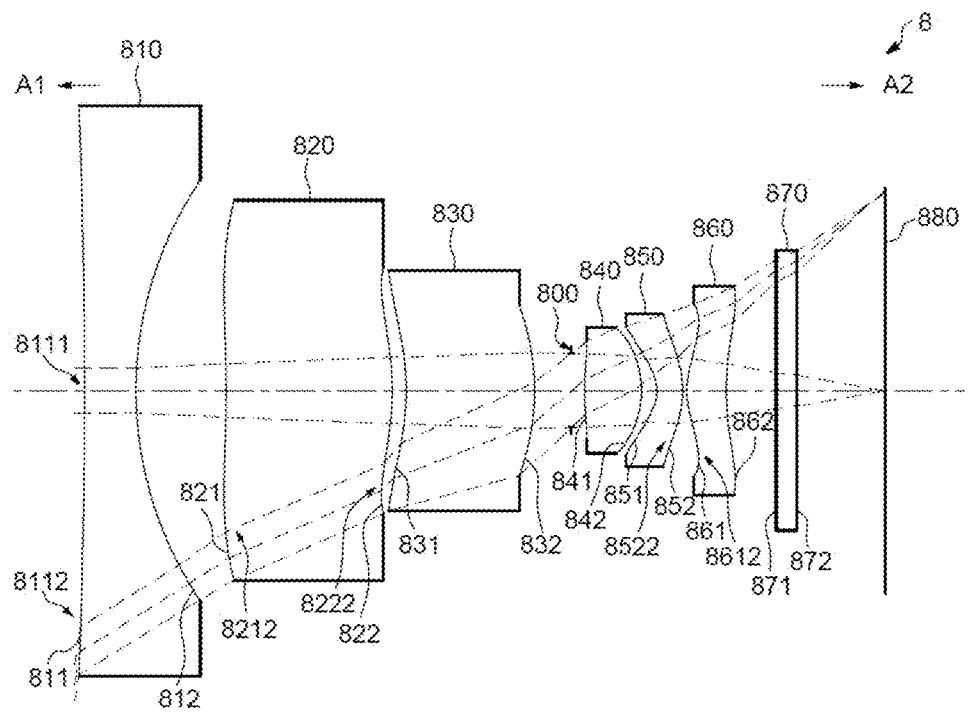
FIG. 34 depicts a cross-sectional view of an eighth embodiment of an optical imaging lens having six lens elements according to the present disclosure.
Figure 35:
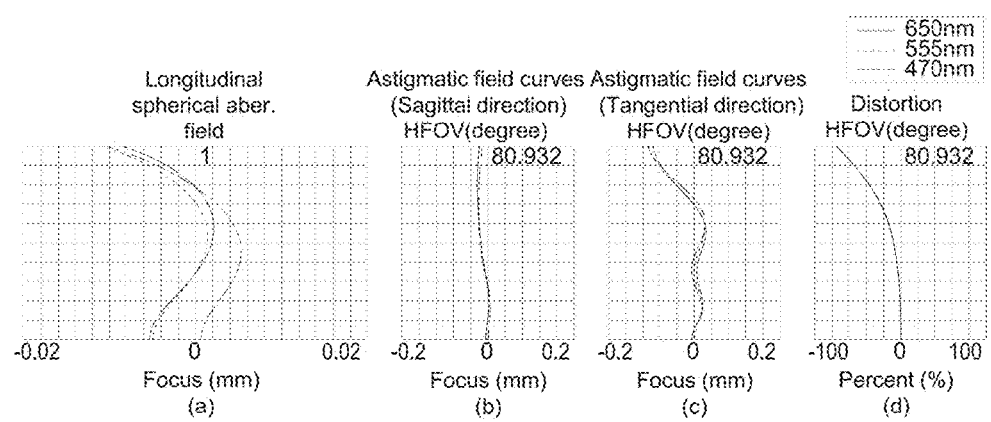
FIG. 35 depicts a chart of longitudinal spherical aberration and other kinds of optical aberrations of an eighth embodiment of the optical imaging lens according to the present disclosure.

Reference is now made to FIGS. 34-37. FIG. 34 illustrates an example cross-sectional view of an optical imaging lens 8 having six lens elements of the optical imaging lens according to an eighth example embodiment. FIG. 35 shows example charts of longitudinal spherical aberration and other kinds of optical aberrations of the optical imaging lens 8 according to the eighth embodiment. FIG. 36 shows an example table of optical data of each lens element of the optical imaging lens 8 according to the eighth example embodiment. FIG. 37 shows an example table of aspherical data of the optical imaging lens 8 according to the eighth example embodiment. The reference numbers labeled in the present embodiment are similar to those in the first embodiment for the similar elements, but here the reference numbers are initialed with 8, for example, reference number 831 for labeling the object-side surface of the third lens element 830, reference number 832 for labeling the image-side surface of the third lens element 830, etc.

As shown in FIG. 34, the optical imaging lens 8 of the present embodiment, in an order from an object side A1 to an image side A2 along an optical axis, may comprise a first lens element 810, a second lens element 820, a third lens element 830, an aperture stop 800, a fourth lens element 840, a fifth lens element 850 and a sixth lens element 860.

The differences between the eighth embodiment and the first embodiment may include the radius of curvature and thickness of each lens element, the distance of each air gap, aspherical data, related optical parameters, such as back focal length, and the configuration of the concave/convex shape of the object-side surfaces 811, 821, 861 and the image-side surfaces 822, 852; but the configuration of the concave/convex shape of surfaces, comprising the object-side surfaces 831, 841, 851 facing to the object side A1 and the image-side surfaces 812, 832, 842, 862 facing to the image side A2, are similar to those in the first embodiment. Specifically, the differences of configuration of surface shape are: the object-side surface 811 may be a concave surface comprising a concave portion 8111 in a vicinity of the optical axis and a concave portion 8112 in a vicinity of a periphery of the first lens element 810, the object-side surface 821 may comprise a convex portion 8212 in a vicinity of a periphery of the second lens element 820, the image-side surface 822 may comprise a concave portion 8222 in a vicinity of the periphery of the second lens element 820, the image-side surface 852 may comprise a convex portion 8522 in a vicinity of a periphery of the fifth lens element 850, and the object-side surface 861 may comprise a concave portion 8612 in a vicinity of a periphery of the sixth lens element 860. Please refer to FIG. 36 for the optical characteristics of each lens elements in the optical imaging lens 8 of the present embodiment, please refer to FIG. 46 for the values of BFL, EFL, TTL, ALT, AAG, SL, SL/TTL, TTL/(T3+G34), T3/T5, AAG/T2, EFL/T1, ALT/EFL, (G12+G23)/T5, EFL/(G34+G56), ALT/(T1+T4), T6/(G34+G45), ALT/(T3+T5), (G12+G45)/T4, T3/(G23+G34), (T2+T5)/EFL, ALT/(T4+T5+T6) and T2/T1 of the present embodiment.

As the longitudinal spherical aberration shown in FIG. 35(*a*), the offset of the off-axis light relative to the image point may be within about ±0.02 mm. As the astigmatism aberration in the sagittal direction shown in FIG. 35(*b*), the focus variation with respect to the three wavelengths in the whole field may fall within about ±0.2 mm. As the astigmatism aberration in the tangential direction shown in FIG. 35(*c*), the focus variation with respect to the three wavelengths in the whole field may fall within about ±0.2 mm. As shown in FIG. 35(*d*), the variation of the distortion aberration may be within about ±80%.

Compared with the first embodiment, the longitudinal spherical aberration and the astigmatism aberration in the tangential direction of the optical imaging lens 8 are less. According to the value of the aberrations, it is shown that the optical imaging lens 8 of the present embodiment, with the length as short as about 8.054 mm and HFOV as large as 80.932 degrees, is capable to provide good imaging quality as well as good optical characteristics. Further, the optical imaging lens 8 of the present embodiment shows a good yield in the manufacture process.

Figure 38:
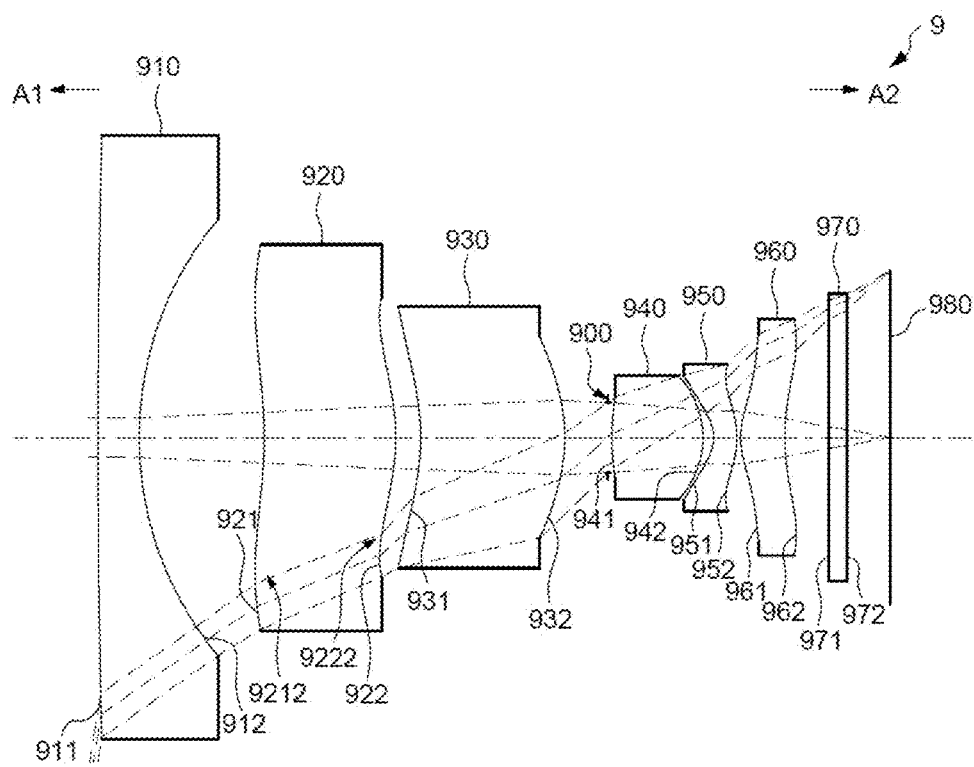
FIG. 38 depicts a cross-sectional view of a ninth embodiment of an optical imaging lens having six lens elements according to the present disclosure.
Figure 39:
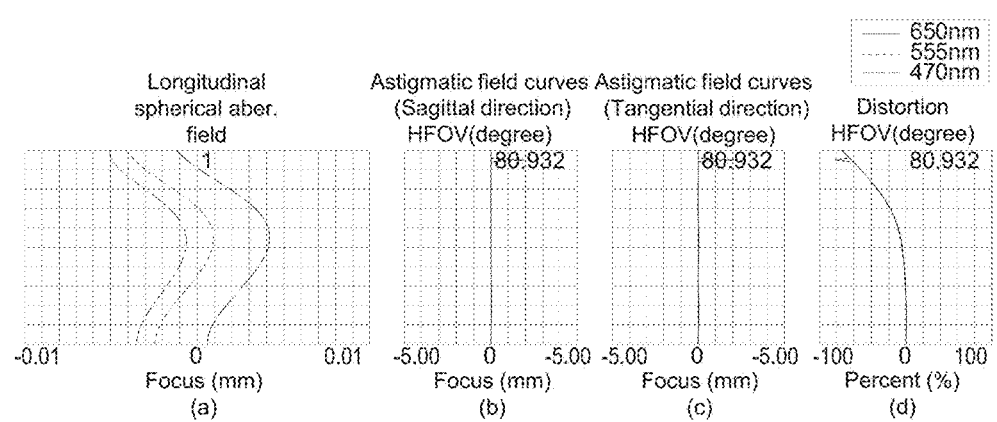
FIG. 39 depicts a chart of longitudinal spherical aberration and other kinds of optical aberrations of a ninth embodiment of the optical imaging lens according to the present disclosure.

Reference is now made to FIGS. 38-41. FIG. 38 illustrates an example cross-sectional view of an optical imaging lens 9 having six lens elements of the optical imaging lens according to an ninth example embodiment. FIG. 39 shows example charts of longitudinal spherical aberration and other kinds of optical aberrations of the optical imaging lens 9 according to the ninth embodiment. FIG. 40 shows an example table of optical data of each lens element of the optical imaging lens 9 according to the ninth example embodiment. FIG. 41 shows an example table of aspherical data of the optical imaging lens 9 according to the ninth example embodiment. The reference numbers labeled in the present embodiment are similar to those in the first embodiment for the similar elements, but here the reference numbers are initialed with 9, for example, reference number 931 for labeling the object-side surface of the third lens element 930, reference number 932 for labeling the image-side surface of the third lens element 930, etc.

As shown in FIG. 38, the optical imaging lens 9 of the present embodiment, in an order from an object side A1 to an image side A2 along an optical axis, may comprise a first lens element 910, a second lens element 920, a third lens element 930, an aperture stop 900, a fourth lens element 940, a fifth lens element 950 and a sixth lens element 960.

The differences between the ninth embodiment and the first embodiment may include the radius of curvature and thickness of each lens element, the distance of each air gap, aspherical data, related optical parameters, such as back focal length, and the configuration of the concave/convex shape of the object-side surface 921 and the image-side surface 922; but the configuration of the concave/convex shape of surfaces, comprising the object-side surfaces 911, 931, 941, 951, 961 facing to the object side A1 and the image-side surfaces 912, 932, 942, 952, 962 facing to the image side A2, are similar to those in the first embodiment. Specifically, the differences of configuration of surface shape are: the object-side surface 921 may comprise a convex portion 9212 in a vicinity of a periphery of the second lens element 920, and the image-side surface 922 may comprise a concave portion 9222 in a vicinity of the periphery of the second lens element 920. Please refer to FIG. 40 for the optical characteristics of each lens elements in the optical imaging lens 9 of the present embodiment, please refer to FIG. 46 for the values of BFL, EFL, TTL, ALT, AAG, SL, SL/TTL, TTL/(T3+G34), T3/T5, AAG/T2, EFL/T1, ALT/EFL, (G12+G23)/T5, EFL/(G34+G56), ALT/(T1+T4), T6/(G34+G45), ALT/(T3+T5), (G12+G45)/T4, T3/(G23+G34), (T2+T5)/EFL, ALT/(T4+T5+T6) and T2/T1 of the present embodiment.

As the longitudinal spherical aberration shown in FIG. 39(*a*), the offset of the off-axis light relative to the image point may be within about ±0.1 mm. As the astigmatism aberration in the sagittal direction shown in FIG. 39(*b*), the focus variation with respect to the three wavelengths in the whole field may fall within about ±5 mm. As the astigmatism aberration in the tangential direction shown in FIG. 39(*c*), the focus variation with respect to the three wavelengths in the whole field may fall within about ±5 mm. As shown in FIG. 39(*d*), the variation of the distortion aberration may be within about ±90%.

Compared with the first embodiment, the astigmatism aberration in the tangential direction of the optical imaging lens 9 is less. According to the value of the aberrations, it is shown that the optical imaging lens 9 of the present embodiment, with the length as short as about 8.986 mm and HFOV as large as 80.932 degrees, is capable to provide good imaging quality as well as good optical characteristics.

Figure 42:
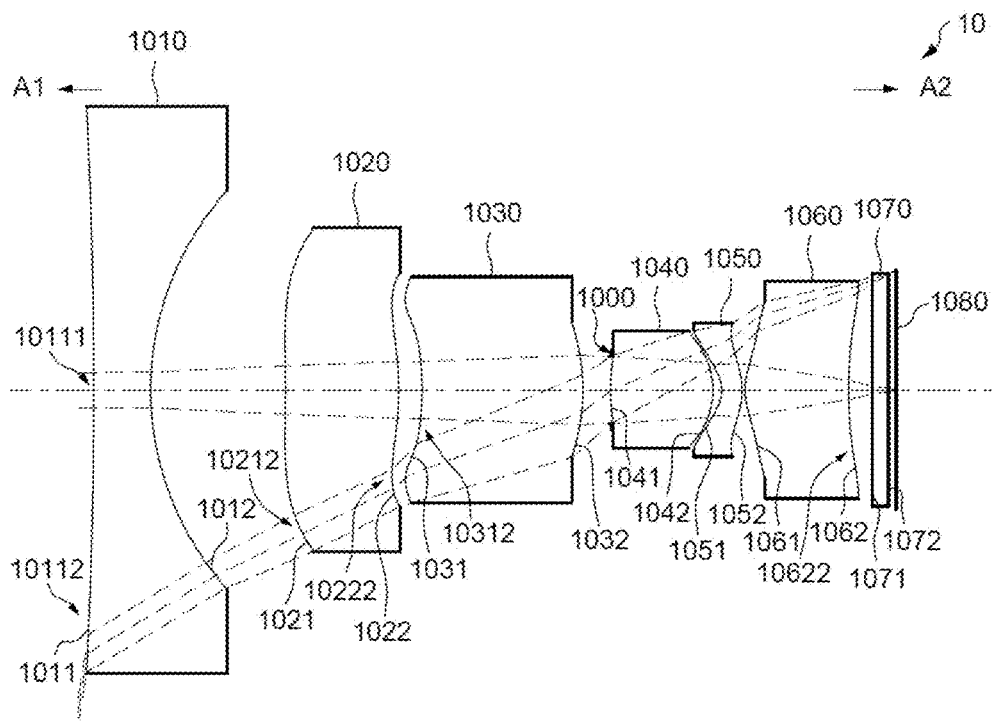
FIG. 42 depicts a cross-sectional view of a tenth embodiment of an optical imaging lens having six lens elements according to the present disclosure.
Figure 43:
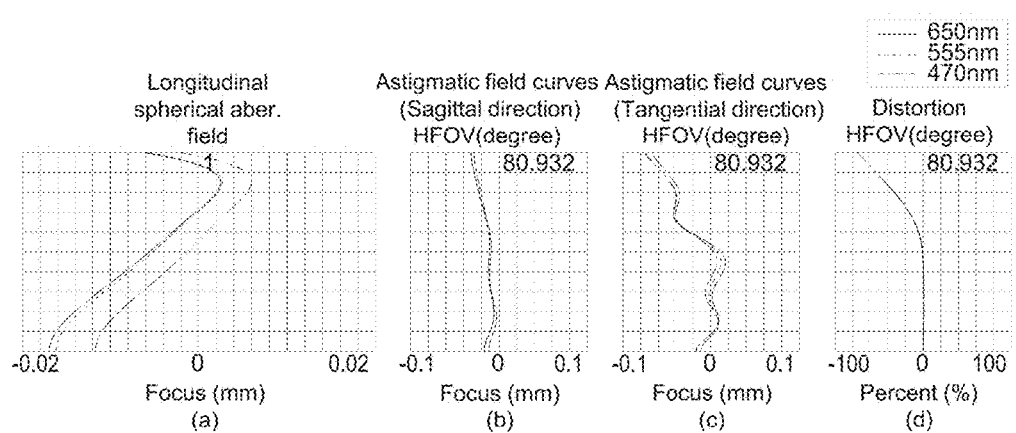
FIG. 43 depicts a chart of longitudinal spherical aberration and other kinds of optical aberrations of a tenth embodiment of the optical imaging lens according to the present disclosure.

Reference is now made to FIGS. 42-45. FIG. 42 illustrates an example cross-sectional view of an optical imaging lens 10 having six lens elements of the optical imaging lens according to an tenth example embodiment. FIG. 43 shows example charts of longitudinal spherical aberration and other kinds of optical aberrations of the optical imaging lens 10 according to the tenth embodiment. FIG. 44 shows an example table of optical data of each lens element of the optical imaging lens 10 according to the tenth example embodiment. FIG. 45 shows an example table of aspherical data of the optical imaging lens 10 according to the tenth example embodiment. The reference numbers labeled in the present embodiment are similar to those in the first embodiment for the similar elements, but here the reference numbers are initialed with 10, for example, reference number 1031 for labeling the object-side surface of the third lens element 1030, reference number 1032 for labeling the image-side surface of the third lens element 1030, etc.

As shown in FIG. 42, the optical imaging lens 10 of the present embodiment, in an order from an object side A1 to an image side A2 along an optical axis, may comprise a first lens element 1010, a second lens element 1020, an aperture stop 1000, a third lens element 1030, a fourth lens element 1040, a fifth lens element 1050 and a sixth lens element 1060.

The differences between the tenth embodiment and the first embodiment may include the radius of curvature and thickness of each lens element, the distance of each air gap, aspherical data, related optical parameters, such as back focal length, and the configuration of the concave/convex shape of the object-side surfaces 1011, 1021, 1031 and the image-side surfaces 1022, 1062; but the configuration of the concave/convex shape of surfaces, comprising the object-side surfaces 1041, 1051, 1061 facing to the object side A1 and the image-side surfaces 1012, 1032, 1042, 1052 facing to the image side A2, are similar to those in the first embodiment. Specifically, the differences of configuration of surface shape are: the object-side surface 1011 may be a concave surface comprising a concave portion 10111 in a vicinity of the optical axis and a concave portion 10112 in a vicinity of a periphery of the first lens element 1010, the object-side surface 1021 may comprise a convex portion 10212 in a vicinity of a periphery of the second lens element 1020, the image-side surface 1022 may comprise a concave portion 10222 in a vicinity of the periphery of the second lens element 1020, the object-side surface 1031 may comprise a convex portion 10312 in a vicinity of a periphery of the third lens element 1030, and the image-side surface 1062 may comprise a concave portion 10622 in a vicinity of a periphery of the sixth lens element 1060. Please refer to FIG. 44 for the optical characteristics of each lens elements in the optical imaging lens 10 of the present embodiment, please refer to FIG. 46 for the values of BFL, EFL, TTL, ALT, AAG, SL, SL/TTL, TTL/(T3+G34), T3/T5, AAG/T2, EFL/T1, ALT/EFL, (G12+G23)/T5, EFL/(G34+G56), ALT/(T1+T4), T6/(G34+G45), ALT/(T3+T5), (G12+G45)/T4, T3/(G23+G34), (T2+T5)/EFL, ALT/(T4+T5+T6) and T2/T1 of the present embodiment.

As the longitudinal spherical aberration shown in FIG. 43(a), the offset of the off-axis light relative to the image point may be within about ±0.02 mm. As the astigmatism aberration in the sagittal direction shown in FIG. 43(b), the focus variation with respect to the three wavelengths in the whole field may fall within about ±0.1 mm. As the astigmatism aberration in the tangential direction shown in FIG. 43(c), the focus variation with respect to the three wavelengths in the whole field may fall within about ±0.1 mm. As shown in FIG. 43(d), the variation of the distortion aberration may be within about ±80%.

Compared with the first embodiment, the longitudinal spherical aberration, the astigmatism aberration in the tangential direction and Fno of the optical imaging lens 10 are less. According to the value of the aberrations, it is shown that the optical imaging lens 10 of the present embodiment, with the length as short as about 10.331 mm and HFOV as large as 80.932 degrees, is capable to provide good imaging quality as well as good optical characteristics.

Please refer to FIG. 46, which show the values of T1, G12, T2, G23, T3, G34, T4, G45, T5, T56, T6, BFL, EFL, TTL, ALT, AAG, SL, SL/TTL, TTL/(T3+G34), T3/T5, AAG/T2, EFL/T1, ALT/EFL, (G12+G23)/T5, EFL/(G34+G56), ALT/(T1+T4), T6/(G34+G45), ALT/(T3+T5), (G12+G45)/T4, T3/(G23+G34), (T2+T5)/EFL, ALT/(T4+T5+T6) and T2/T1 of all ten embodiments, and it is clear that the optical imaging lens of the present disclosure satisfy the inequalities (1), (2) and/or inequalities (3)~(16).

According to above illustration, the longitudinal spherical aberration, astigmatism aberration both in the sagittal direction and tangential direction and distortion aberration in all embodiments are meet user term of a related product in the market. The off-axis light with respect to three different wavelengths (470 nm, 555 nm, 650 nm) is focused around an image point and the offset of the off-axis light relative to the image point is well controlled with suppression for the longitudinal spherical aberration, astigmatism aberration both in the sagittal direction and tangential direction and distortion aberration. The curves of different wavelengths are closed to each other, and this represents that the focusing for light having different wavelengths is good to suppress chromatic dispersion. In summary, lens elements are designed and matched for achieving good imaging quality.

While various embodiments in accordance with the disclosed principles been described above, it should be understood that they are presented by way of example only, and are not limiting. Thus, the breadth and scope of example embodiment(s) should not be limited by any of the above-described embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 C.F.R. 1.77 or otherwise to provide organizational cues. These headings shall not limit or characterize the invention(s) set out in any claims that may issue from this disclosure. Specifically, a description of a technology in the "Background" is not to be construed as an admission that technology is prior art to any invention(s) in this disclosure. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings herein.

What is claimed is:

1. An optical imaging lens, comprising an aperture stop and six lens elements comprising first, second, third, fourth, fifth and sixth lens elements sequentially from an object side to an image side along an optical axis, each of the first, second, third, fourth, fifth and sixth lens elements having refracting power, an object-side surface facing toward the object side and an image-side surface facing toward the image side, wherein:

the image-side surface of the first lens element comprises a concave portion in a vicinity of the optical axis and a concave portion in a vicinity of a periphery of the first lens element;

the image-side surface of the second lens element comprises a convex portion in a vicinity of the optical axis;

the object-side surface of the third lens element comprises a concave portion in a vicinity of the optical axis, and the image-side surface of the third lens element comprises a convex portion in a vicinity of the optical axis;

the image-side surface of the fourth lens element comprises a convex portion in a vicinity of the optical axis;

the object-side surface of the fifth lens element comprises a concave portion in a vicinity of the optical axis, and the image-side surface of the fifth lens element comprises a convex portion in a vicinity of the optical axis;

the image-side surface of the sixth lens element comprises a concave portion in a vicinity of the optical axis;

the optical imaging lens comprises no other lenses having refracting power beyond the six lens elements; and a distance between the aperture stop and an image plane along the optical axis is represented by SL, a distance between the object-side surface of the first lens element and the image plane along the optical axis is represented by TTL, a central thickness of the third lens element is represented by T3, an air gap between the third lens element and the fourth lens element along the optical axis is represented by G34, and SL, TTL, T3 and G34 satisfy the inequality:

$SL/TTL \le 0.75$; and $TTL/(T3+G34) \le 7.3$.

2. The optical imaging lens according to claim 1, wherein a central thickness of the fifth lens element is represented by T5 and T3 and T5 satisfy the inequality:

$T3/T5 \ge 2.0$.

3. The optical imaging lens according to claim 1, wherein a sum of all five air gaps from the first lens element to the sixth lens element along the optical axis is represented by AAG, a central thickness of the second lens element is represented by T2, and AAG and T2 satisfy the inequality:

$AAG/T2 \le 2.5$.

4. The optical imaging lens according to claim 1, wherein an effective focal length of the optical imaging lens is represented by EFL, a central thickness of the first lens element, represented by T1, and EFL and T1 satisfy the inequality:

$EFL/T1 \le 2.5$.

5. The optical imaging lens according to claim 1, wherein a sum of central thicknesses of all six lens elements is represented by ALT, an effective focal length of the optical imaging lens is represented by EFL, and ALT and EFL satisfy the inequality:

$ALT/EFL \ge 3.0$.

6. The optical imaging lens according to claim 1, wherein an air gap between the first lens element and the second lens element along the optical axis, represented by G12, an air gap between the second lens element and the third lens element along the optical axis, represented by G23, a central thickness of the fifth lens element is represented by T5, and G12, G23 and T5 satisfy the inequality:

$(G12+G23)/T5 \ge 3.5$.

7. The optical imaging lens according to claim 1, wherein an effective focal length of the optical imaging lens is represented by EFL, an air gap between the fifth lens element and the sixth lens element along the optical axis is represented by G56, and EFL, G34 and G56 satisfy the inequality:

$EFL/(G34+G56) \le 2.5$.

8. The optical imaging lens according to claim 1, wherein a sum of central thicknesses of all six lens elements is represented by ALT, a central thickness of the first lens element, represented by T1, a central thickness of the fourth lens element, represented by T4, and ALT, T1 and T4 satisfy the inequality:

$ALT/(T1+T4) \ge 3.0$.

9. The optical imaging lens according to claim 1, wherein a central thickness of the sixth lens element is represented by T6, an air gap between the fourth lens element and the fifth lens element along the optical axis is represented by G45, and T6, G34 and G45 satisfy the inequality:

$T6/(G34+G45) \le 3.0$.

10. The optical imaging lens according to claim 1, wherein the first lens element has negative refracting power.

11. The optical imaging lens according to claim 1, wherein a sum of the central thicknesses of all six lens elements is represented by ALT, a central thickness of the fifth lens element, represented by T5, and ALT, T3 and T5 satisfy the inequality:

$ALT/(T3+T5) \le 4.0$.

12. The optical imaging lens according to claim 1, wherein an air gap between the first lens element and the second lens element along the optical axis is represented by G12, an air gap between the fourth lens element and the fifth lens element along the optical axis is represented by G45, a central thickness of the fourth lens element is represented by T4, and G12, G45 and T4 satisfy the inequality:

$(G12+G45)/T4 \ge 1.3$.

13. The optical imaging lens according to claim 1, wherein an air gap between the second lens element and the third lens element along the optical axis is represented by G23, and T3, G23 and G34 satisfy the inequality:

$T3/(G23+G34) \ge 2.0$.

14. The optical imaging lens according to claim 1, wherein a central thickness of the second lens element, represented by T2, a central thickness of the fifth lens element is represented by T5, an effective focal length of the optical imaging lens is represented by EFL, and T2, T5 and EFL satisfy the inequality:

$(T2+T5)/EFL \ge 1.4$.

15. The optical imaging lens according to claim 1, wherein a sum of central thicknesses of all six lens elements is represented by ALT, a central thickness of the fourth lens element is represented by T4, a central thickness of the fifth lens element is represented by T5, a central thickness of the sixth lens element is represented by T6, and ALT, T4, T5 and T6 satisfy the inequality:

$ALT/(T4+T5+T6) \ge 2.3$.

16. The optical imaging lens according to claim 1, wherein a central thickness of the second lens element is represented by T2, a central thickness of the first lens element is represented by T1, and T2 and T1 satisfy the inequality:

$T2/T1 \ge 2.0$.

* * * * *